(12) United States Patent
Ono et al.

(10) Patent No.: US 10,972,562 B2
(45) Date of Patent: *Apr. 6, 2021

(54) INFORMATION PROCESSING APPARATUS, INFORMATION PROCESSING METHOD, AND PROGRAM

(71) Applicant: Sony Corporation, Tokyo (JP)

(72) Inventors: Hideyuki Ono, Kanagawa (JP); Masanori Katsu, Tokyo (JP); Masatomo Kurata, Tokyo (JP); Takashi Ogata, Tokyo (JP); Sota Matsuzawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/790,736

(22) Filed: Feb. 14, 2020

(65) Prior Publication Data
US 2020/0186608 A1 Jun. 11, 2020

Related U.S. Application Data

(63) Continuation of application No. 14/896,032, filed as application No. PCT/JP2014/003702 on Jul. 11, 2014, now Pat. No. 10,601,935.

(30) Foreign Application Priority Data
Aug. 12, 2013 (JP) .................... 2013-167485

(51) Int. Cl.
*H04L 29/08* (2006.01)
*H04W 4/70* (2018.01)
(Continued)

(52) U.S. Cl.
CPC ............. *H04L 67/22* (2013.01); *G06Q 50/01* (2013.01); *H04L 51/043* (2013.01); *H04W 4/025* (2013.01); *H04W 4/70* (2018.02)

(58) Field of Classification Search
CPC ....... G06Q 50/01; H04L 51/043; H04L 67/22; H04W 4/025; H04W 4/70
See application file for complete search history.

(56) References Cited

U.S. PATENT DOCUMENTS 10,601,935 B2 * 3/2020 Ono ...................... H04W 4/025
2009/0063995 A1 3/2009 Baron et al.
(Continued)

FOREIGN PATENT DOCUMENTS

CN 101751220 A 6/2010
JP 2001-137536 5/2001
(Continued)

OTHER PUBLICATIONS

U.S. Appl. No. 61/745,908.
(Continued)

*Primary Examiner* — June Y Sison
(74) *Attorney, Agent, or Firm* — Xsensus LLP

(57) ABSTRACT

An information processing system that generates commentary, the commentary including first commentary generated based on behavior information corresponding to a behavior of a user and second commentary associated with the first commentary; and outputs the commentary to be available to other users.

21 Claims, 15 Drawing Sheets

(51) Int. Cl.
*G06Q 50/00* (2012.01)
*H04L 12/58* (2006.01)
*H04W 4/02* (2018.01)

(56) References Cited

U.S. PATENT DOCUMENTS

| | | |
|---|---|---|
| 2009/0271821 A1 | 10/2009 | Zalewski et al. |
| 2010/0146433 A1 | 6/2010 | Murata et al. |
| 2010/0191697 A1 | 7/2010 | Fukumoto et al. |
| 2011/0081634 A1 | 4/2011 | Kurata et al. |
| 2012/0290109 A1 | 11/2012 | Engelberg et al. |
| 2013/0111350 A1* | 5/2013 | Ishii ............... G06Q 30/0201 715/739 |
| 2014/0115459 A1* | 4/2014 | Norwood ............ G06F 3/0482 715/708 |
| 2015/0088464 A1 | 3/2015 | Yuen et al. |
| 2016/0134714 A1* | 5/2016 | Ono .................... H04W 4/025 709/205 |
| 2016/0198223 A1 | 7/2016 | Maluk et al. |
| 2016/0277326 A1 | 9/2016 | Sherrets et al. |
| 2017/0072264 A1* | 3/2017 | Hoffman .............. G16H 40/67 |
| 2018/0095636 A1* | 4/2018 | Valdivia ............. G06F 3/04815 |

FOREIGN PATENT DOCUMENTS

| | | |
|---|---|---|
| JP | 2004-329357 | 11/2004 |
| JP | 2006-345269 | 12/2006 |
| JP | 2007-249993 | 9/2007 |
| JP | 2008-003655 | 1/2008 |
| JP | 2010-134802 | 6/2010 |
| JP | 2010-198595 | 9/2010 |
| JP | 2011-081431 | 4/2011 |
| JP | 2012-079073 | 4/2012 |
| JP | 2013-097631 | 5/2013 |

OTHER PUBLICATIONS

Sep. 30, 2018, Chinese Office Action issued for related CN Application No. 201480032775.5.
Jun. 13, 2018, European Communication issued for related EP Application No. 14755719.3.

* cited by examiner

INFORMATION PROCESSING APPARATUS, INFORMATION PROCESSING METHOD, AND PROGRAM

CROSS-REFERENCE TO RELATED APPLICATIONS

This application is a continuation of U.S. application Ser. No. 14/896,032, filed Dec. 4, 2015, which is based on PCT filing PCT/JP2014/003702, filed Jul. 11, 2014, which claims the benefit of Japanese Priority Patent Application JP 2013-167485 filed Aug. 12, 2013, the entire contents of each are incorporated herein by reference.

TECHNICAL FIELD

The present disclosure relates to an information processing apparatus, an information processing method, and a program.

BACKGROUND ART

With the widespread use of social media, sharing of behaviors among users via a network is becoming popular. For example, PTL 1 describes a technology that reflects actual behavior of each user such as walking, running, sitting, standing, and speaking on the phone in a pose of objects showing other users in a virtual space displayed on the screen and represents the degree of friendship between a user and each of other users, the actual position of each user, and characteristics and preferences of behavior by showing the display position of each object.

CITATION LIST

Patent Literature

PTL 1: JP 2010-134802A

SUMMARY

Technical Problem

However, the technology as described in the above Patent Literature 1 is not necessarily adequate to represent real-time properties. Behavior of other shared users occurs in real time and if such real-time properties are not represented adequately, it is difficult for the user referring to behavior to have an adequate interest in other users' behavior.

Therefore, the present disclosure proposes a novel and improved information processing apparatus capable of effectively representing real-time properties when users share behaviors of their own, an information processing method, and a program.

Solution to Problem

According to a first exemplary embodiment the disclosure is directed to an information processing system that generates commentary, the commentary including first commentary generated based on behavior information corresponding to a behavior of a user and second commentary associated with the first commentary; and outputs the commentary to be available to other users.

According to another exemplary embodiment the disclosure is directed to a method performed by an information processing system, the method including generating commentary, the commentary including first commentary generated based on behavior information corresponding to a behavior of a user and second commentary associated with the first commentary; and outputting the commentary to be available to other users.

According to another exemplary embodiment the disclosure is directed to a non-transitory computer-readable medium including computer-program instructions, which when executed by an information processing system, cause the information processing system to: generate commentary, the commentary including first commentary generated based on behavior information corresponding to a behavior of a user and second commentary associated with the first commentary; and output the commentary to be available to other users

Advantageous Effects of Invention

According to the present disclosure, as described above, real-time properties can effectively be represented when users share behaviors of their own.

DESCRIPTION OF EMBODIMENT

A preferred embodiment of the present disclosure will be described in detail below with reference to the appended drawings. Note that in this specification and the drawings, the same reference signs are attached to elements having substantially the same function and configuration, thereby omitting duplicate descriptions.

The description will be provided in the order shown below:
1. System Configuration
2. Function Configuration
3. Screen Display Examples of Behavior Sharing
3-1. List Display Screen
3-2. Virtual Space Display Screen
3-3. Individual Information Screen
4. Commentary Based on Behavior Recognition
4-1. Display Example of Commentary
4-2. Configuration Example of Descriptive Commentary
4-3. Configuration Example of Commenting Commentary
5. Commentary Based on Posting
5-1. Display Example of Commentary
6. Summary Representation of Commentary
7. Operation When Starting and Ending Commentary
8. Hardware Configuration
9. Supplemental Remarks
(1. System Configuration)

Figure 1:
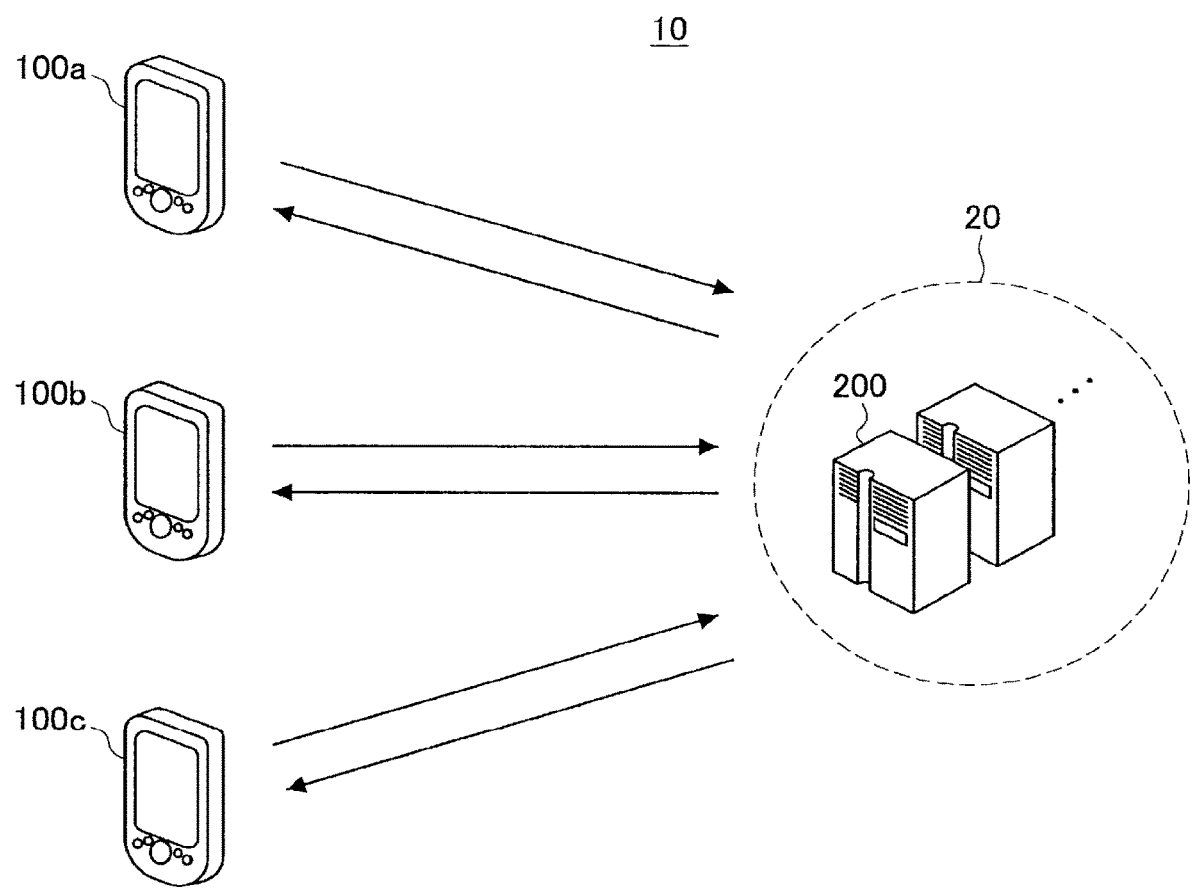
FIG. 1 is a diagram showing a schematic configuration of a system according to an embodiment of the present disclosure.

FIG. 1 is a diagram showing a schematic configuration of a system according to an embodiment of the present disclosure. Referring to FIG. 1, a system 10 according to the present embodiment includes a client apparatus 100 and a server apparatus 200. A server 20 is configured by the single server apparatus 200 or a plurality of the server apparatuses 200 working in cooperation and the server 20 communicates with the client apparatus 100 via a network to provide services to the client apparatus 100. The client apparatus 100 and the server apparatus 200 are each realized by the hardware configuration of an information processing apparatus described later.

In the present embodiment, the client apparatus 100 includes a plurality of client apparatuses 100a, 100b, 100c. These client apparatuses 100 can each be possessed and/or carried by different users. In the present embodiment, as will be described later, an object generated based on behavior of a user (called behavior of user B) recognized by using, for example, the client apparatus 100b can be displayed in a virtual space by the other client apparatuses 100a, 100c and/or the client apparatus 100b. The object can be an object displaying the user B. Similarly, objects generated based on behavior of each user (called behavior of users A, C) recognized by using the client apparatuses 100A, 100C can be displayed in a virtual space by each of the client apparatuses 100a to 100c.

In the present embodiment, having an object generated based on information indicating behavior of each user by each of the client apparatuses 100 in this manner arranged, behaviors of each user can be shared in a virtual space regardless of the location of each user.

(2. Function Configuration)

Figure 2:
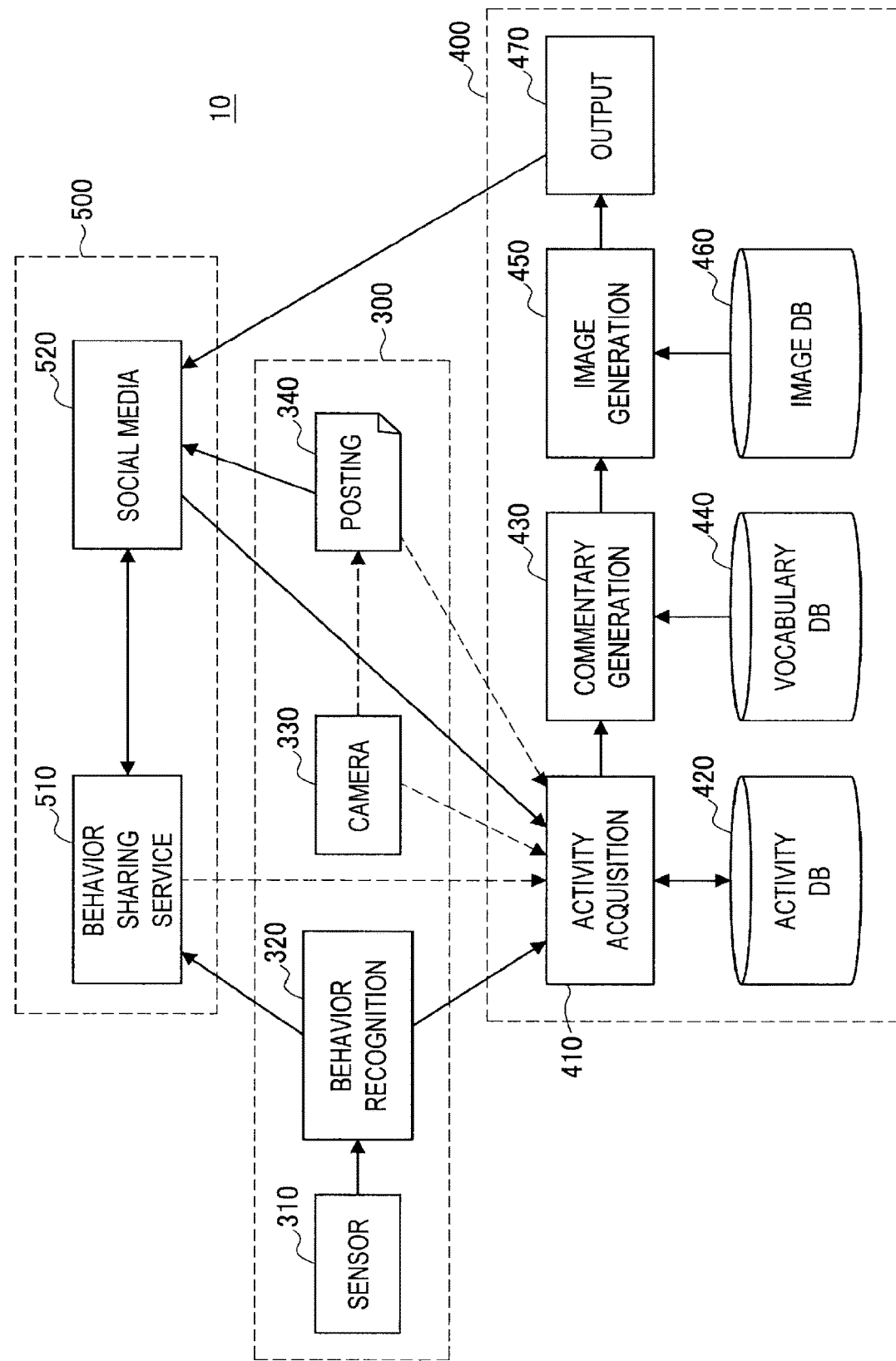
FIG. 2 is a block diagram showing a schematic function configuration of the system according to an embodiment of the present disclosure.

FIG. 2 is a block diagram showing a schematic function configuration of the system according to an embodiment of the present disclosure. Hereinafter, functions realized by the system 10 shown in FIG. 1 are divided into function groups 300, 400, 500 and described.

Which of the client apparatus 100 and the server apparatus 200 are to be used can freely be decided to realize each function contained in each function group. For example, the function groups 300, 400 may be realized by the client apparatus 100 and the function group 500 may be realized by the server 20. Alternatively, the function group 300 may be realized by the client apparatus 100 and the function groups 400, 500 may be realized by the server 20. Further, functions contained in each function group may be realized by the client apparatus 100 and the server 20 in a distributed manner. For example, a sensor 310, a camera 330, and a posting function 340 contained in the function group 300 may be realized by the client apparatus 100 and a behavior recognition function 320 and the function groups 400, 500 may be realized by the server 20.

(Function Group 300)

The function group 300 is a function group to generate information based on user's behavior. The function group 300 can contain the sensor 310, the behavior recognition function 320, the camera 330, and the posting function 340.

The sensor 310 contains, for example, an acceleration sensor that detects acceleration of the client apparatus 100. For example, a motion state of the user carrying the client apparatus 100 can be recognized by the acceleration sensor. In addition to the acceleration sensor, the sensor 310 may contain various sensors, for example, a gyro sensor, a geomagnetic sensor, an optical sensor, a sound sensor, and an atmospheric pressure sensor. For example, the posture and orientation of the client apparatus 100 and the surrounding environment can be detected by these sensors. The sensor 310 may also contain a GPS sensor to acquire position information of the user or a positioning device such as a Wi-Fi communication module.

The behavior recognition function 320 recognizes behavior of the user of the client apparatus 100 based on detection results of the sensor 310. A detailed description of technology of behavior recognition based on detection results of a sensor is omitted here because the technology described in, for example, JP 2010-198595A or JP2011-81431A can be used as such a technology. Behaviors of the user, for example, stopping, walking, running, being on a train, and being in a car can be recognized by the behavior recognition function 320. The behavior recognition function 320 may also recognize a higher level of behavior of the user such as working, staying at home, and shopping based on detection results of the acceleration sensor and position information of the user. Information indicating user's behavior recognized by the behavior recognition function 320 is provided to a behavior sharing service 510. The behavior recognition function 320 is realized by, for example, a processor of the client apparatus 100 or the server apparatus 200.

The camera 330 is, for example, contained in the client apparatus 100 or externally attached thereto and is an imaging device that performs imaging according a user's operation. The posting function 340 is realized by, for example, an input device and an output device of the client apparatus 100 and posts a message, an image or the like to social media 520 according to an input operation of the user via the GUI (Graphical User Interface) displayed on a display or the like. The camera 330 may be linked to the posting function 340 so that a captured image acquired by the user using the camera 330 is posted on the social media 520 by the posting function 340.

(Function Group 400)

The function group 400 is a function group to generate public information including commentary based on information generated as a result of user's behavior. The function group 400 can contain an activity acquisition function 410, a commentary generation function 430, an image generation function 450, and an output function 470. These functions can be realized by, for example, the processor of the client apparatus 100 or the server apparatus 200. The function group 400 can also contain an activity DB 420, a vocabulary DB 440, and an image DB 460. These functions can be realized by, for example, a memory or a storage device of the client apparatus 100 or the server apparatus 200 or a removable recording medium.

The activity acquisition function 410 acquires first information generated as a result of behavior of a first user. In this specification, the first user can mean the user of the client apparatus 100 to be a target of information acquisition by the activity acquisition function 410. More specifically, for example, the activity acquisition function 410 acquires information from the behavior recognition function 320. As described above, the behavior recognition function 320 recognizes behavior of the user of the client apparatus 100 based on detection results of the sensor 310. The behavior recognition result can be acquired by the activity acquisition function 410 as the first information generated as a result of behavior of the first user. As illustrated in FIG. 2, the activity acquisition function 410 may directly acquire information from the behavior recognition function 320 or may indirectly acquire information provided to the behavior sharing service 510 by the behavior recognition function 320.

Also, for example, the activity acquisition function 410 may acquire information from the social media 520. As described above, a message, an image and the like accepted by the posting function 340 are posted on the social media 520. The activity acquisition function 410 acquires a message, an image and the like posted on the social media 520 according to an input operation of the user, from the social media 520 as the first information generated as a result of a behavior of the first user. As illustrated in FIG. 2, the activity acquisition function 410 may indirectly acquire information of posting accepted by the social media 520 or may directly acquire information from the posting function 340 in parallel with transmission of information to the social media 520 when posting is performed by the posting function 340.

As described above, information posted on the social media 520 by the posting function 340 can contain a captured image acquired by the user using the camera 330. The activity acquisition function 410 may also acquire a posted captured image as the first information from the social media 520 or the posting function 340. Also, the activity acquisition function 410 may acquire information about an image acquired by the user using the camera 330, but not posted on the social media 520, from the camera 330.

In this case, as will be described later, since second information including commentary generated based on first information acquired by the activity acquisition function 410 will be open to other users and thus, a procedure for receiving consent from users of the client apparatus 100 may be performed regarding the use of a captured image of the camera 330 as a generation material of commentary. Incidentally, information provided from the behavior recognition function 320 to the behavior sharing service 510 and information posted on the social media 520 by the posting function 340 are predicated on publication and thus, user's consent may not be necessary when the information is acquired by the activity acquisition function 410. However, if, for example, the range of publication of user's behavior in the behavior sharing service 510 or the range of publication of user's posting on the social media 520 and the range of publication of second information including commentary are different, a procedure for receiving users' consent may be performed when the activity acquisition function 410 acquires information from the behavior recognition function 320 or the social media 520.

First information acquired by the activity acquisition function 410 is temporarily or continuously stored in the activity DB 420. As will be described later, commentary based on first information is generated based on information acquired in real time and thus, storage of first information in the activity DB 420 may be temporary. However, when, for example, commentary is generated further based on statistical information obtained from the history of past behavior of the user, the history of first information continuously stored in the activity DB 420 may be referred. For example, first information acquired by the activity acquisition function 410 may all be continuously stored in the activity DB 420 or first information to be stored may be limited to information provided from the behavior recognition function 320 (or the behavior sharing service 510) or information provided from the social media 520 (or the posting function 340). In addition, the activity DB 420 may not necessarily be associated with the activity acquisition function 410. For example, a database in which recognition results by the behavior recognition function 320 are recorded as a log may be used as the activity DB 420.

The commentary generation function 430 generates commentary on behavior of the first user based on first information acquired by the activity acquisition function 410. As described above, the first information is generated as a result of behavior of the first user and may contain behavior recognition results of the first user by the behavior recognition function 320 or posting on the social media 520 by the first user. In this specification, commentary is provided from the perspective of, for example, a disinterested observer. A commentary may mean a description and/or a comment of user's behavior. A commentary contains a portion in which user's behavior is described in the third person, but is not limited to such a portion and may contain additional information of some kind. The additional information may be, for example, a simple accompaniment to a description of user's behavior or a comment based on statistical information obtained from the user's surrounding environment or the history of user's behavior. Concrete examples of such commentary will be described later.

More specifically, for example, the commentary generation function 430 is activated once every predetermined time (for example, one minute) to refer to activity acquired by the activity acquisition function 410 and stored at least temporarily in the activity DB 420. If predetermined conditions are satisfied by activity acquired in the predetermined time, the commentary generation function 430 generates commentary. When, for example, behavior of the first user indicated by behavior recognition results of the user by the behavior recognition function 320 changes or continues without change by an extended predetermined time, the commentary generation function 430 can generate commentary. Also when behavior of the first user is corrected reactively after once being recognized by the behavior recognition function 320 or behavior of the first user matches a predetermined pattern, the commentary generation function 430 may generate commentary.

The predetermined pattern of behavior of the first user is defined by, for example, the order of occurrence and length of a sequence of recognized behavior (each piece of behavior can be regarded as independent behavior). If, for example, the behavior is recognized in the order of first taking a ride in a vehicle (such as a train or a bus), next walking/running for less than 10 min, next staying for less than 10 min, and next taking a ride in a vehicle (such as a train or a bus) again, the user is assumed to have changed vehicles from the recognized pattern of behavior. Therefore, if the pattern is stored in a DB and the recognized pattern of behavior of the first user matches the pattern, an occurrence of the behavior pattern of "changing vehicles" can be detected.

When posting on the social media 520 is performed by the posting function 340 or imaging is performed by the camera 330, the commentary generation function 430 may generate commentary. The generation of commentary based on posting may be performed for activation every predetermined time described above or when posting by the posting function 340 is performed, the commentary generation function 430 may be activated separately from activation every predetermined time to generate commentary.

Commentary generated by the commentary generation function 430 as described above may be, for example, a text commentary and/or an audio commentary. In the illustrated example, in order to generate an image containing commentary by the subsequent image generation function 450, the commentary generation function 430 generates a text commentary. Wording used in a text commentary is decided based on vocabularies stored in the vocabulary DB 440. In the vocabulary DB 440, for example, information provided by the activity acquisition function 410 and information indicating relationships with wording contained in commentary may be stored. Based on, for example, this information, the commentary generation function 430 adds additional information about user's behavior to commentary. Such additional information is also illustrated in more concrete examples of commentary described later.

Incidentally, the generation of commentary based on user's behavior may be performed only at the time specified by the user. That is, the commentary generation function 430 may operate only during the time between the start time and the end time explicitly specified by the user. The user may specify the start time and the end time of commentary by each operation, may specify the duration of commentary at the start time, or may make settings to provide commentary of a predetermined time periodically by a timer.

The image generation function 450 generates an image containing commentary (hereinafter, also called a commentary image) generated by the commentary generation function 430. For example, the image generation function 450 generates an image in which a text commentary generated by the commentary generation function 430 is arranged by associating with a virtual speaker. Accordingly, an image showing like a virtual speaker giving a running commentary on user's behavior may be generated.

The image generation function 450 may also generate an image summarizing and expressing a plurality of commentaries generated by the commentary generation function 430 at predetermined times. In such a case, an image to be generated may be moving images. Such a summary image may be generated when, for example, the predetermined time during which the commentary generation function 430 is activated ends. That is, a summary image may be generated when the commentary specified by a user's operation ends or the commentary specified by a timer ends. Alternatively, a summary image may be generated halfway through commentary once every predetermined time (for example, every three hours) and a more concrete example of the summary image will be described later.

Images to be materials of commentary images by the image generation function 450 are stored in the image DB 460. For example, an image showing a virtual speaker of commentary may be stored in the image DB 460. In such a case, the image of the speaker may change in expression or the like in accordance with, for example, additional information added to commentary. Therefore, images of the speaker of a plurality of expressions and/or poses may be stored in the image DB 460. Also, information showing the relationship between content of commentary and each of the plurality of images of the speaker may be stored.

The output function 470 outputs information containing an image (second information) generated by the image generation function 450 to the social media 520. In the social media 520, the second information may be open to a second user who is different from the first user. The second information may contain, in addition to an image generated by the image generation function 450, text of commentary generated by the commentary generation function 430.

(Function Group 500)

The function group 500 contains the behavior sharing service 510 and the social media 520. These functions are realized by the server 20 and the client apparatus 100 in a distributed manner and provide a function to share behavior and posting of users of a plurality of the client apparatuses 100.

The behavior sharing service 510 provides a function to share behavior information showing behaviors of their own between preset users. In the behavior sharing service 510, for example, information showing user's behavior of each user provided by the behavior recognition function 320 is held and is open to other users allowed to share in sharing settings of each user. For the public, behavior of each user may be expressed, for example, as text or by a user object on a list display screen or a virtual space display screen described later. The behavior sharing service 510 may further include a function to generate information summarizing user's behavior in a predetermined period (for example, one day) and make the information open to the user or other users. Also, the behavior sharing service 510 may include a function to generate ranking information about predetermined items related to behavior. The ranking information may be generated for all users regardless of sharing setting, for example, after making data anonymous. Examples of the above summary information and ranking information will also be described later. For example, the behavior sharing service 510 may present summary information or ranking information to users by associating with information posted on the social media 520. Also, for example, the behavior sharing service 510 may be able to post a snap shot of the virtual space display screen, summary information or the like on the social media 520.

The social media 520 provides a function to make posting from users open to other preset users or to all users. For example, on the social media 520, messages, images and the like posted by the user through the posting function 340 are open to all users using the social media 520 or a portion of users specified by the user according to settings made by the user. In addition to messages, images and the like posted by users, the social media 520 may make, for example, user's profiles open to public. Also, as described above, images are output on the social media 520 by the output function 470 as second information containing commentary on behavior of the first user. Such images are handled as, for example, posting by the first user and open to the second user who is different from the first user according to settings made by the first user. As described above, the second user may be all users using the social media 520 or a portion of users specified by the first user.

As described above, posting itself of the first user on the social media 520 is provided as first information generated as a result of behavior of the first user to the activity acquisition function 410. Among posts made on the social media 520, information for posts indirectly made by the behavior sharing service 510 or the output function 470 may not be provided to the social media 520.

(3. Screen Display Examples of Behavior Sharing)

Subsequently, screen display examples of behavior sharing in an embodiment of the present disclosure will be described. Screens illustrated below are displayed in the client apparatus 100 based on, for example, data provided by the behavior sharing service 510.

(3-1. List Display Screen)

Figure 3:
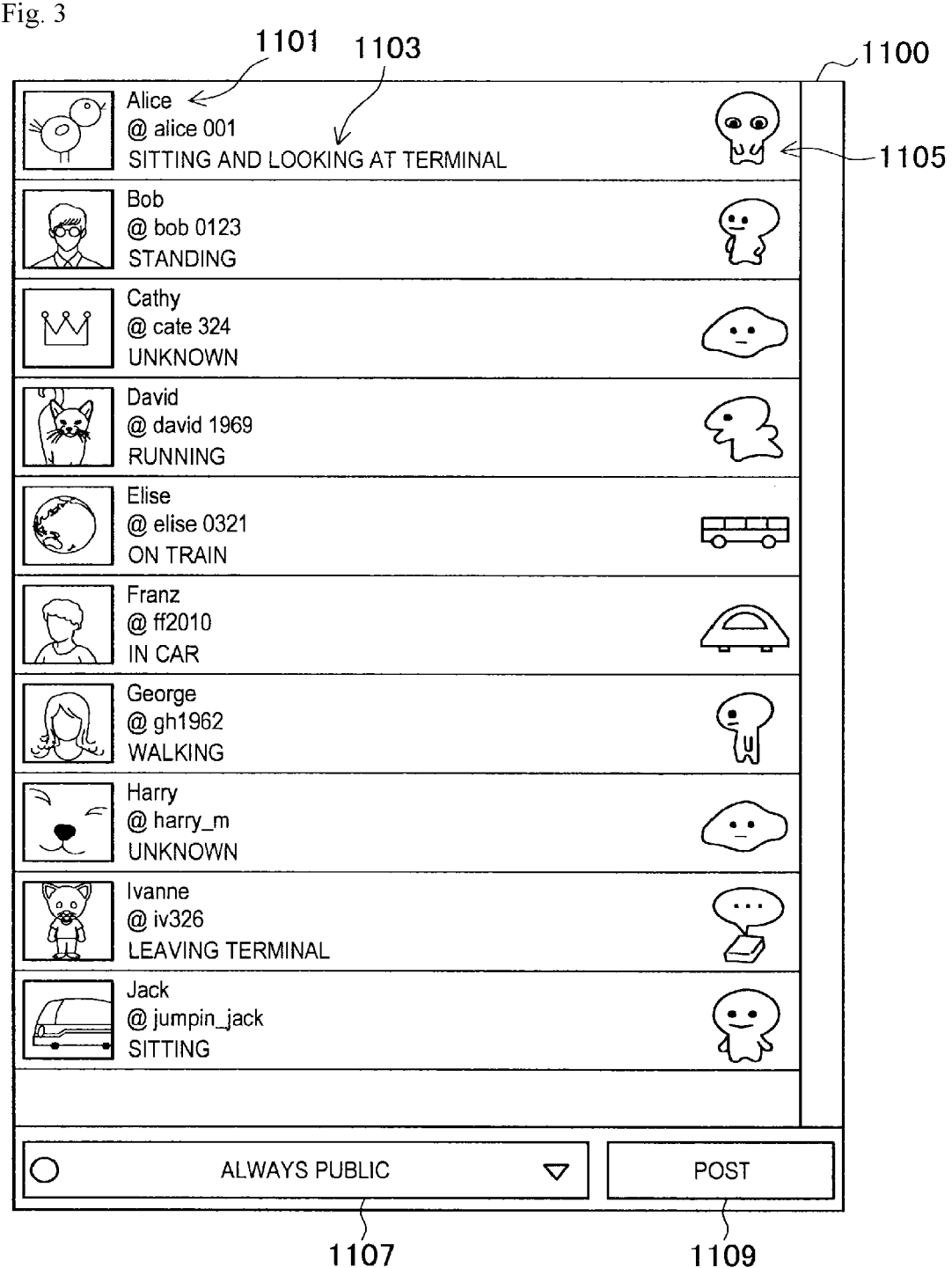
FIG. 3 is a diagram showing an example of a list display screen in an embodiment of the present disclosure.

FIG. 3 is a diagram showing an example of a list display screen in an embodiment of the present disclosure. Referring to FIG. 3, a list display screen 1100 displayed in the display of the client apparatus 100 contains a list containing user information 1101, behavior status 1103, and a user object 1105, a behavior information use setting button 1107, and a posting button 1109.

The user information 1101 contains, for example, as illustrated, a thumbnail image, a user name, and a user ID. Any of the above may be displayed as the user information 1101 or in addition thereto, other information may be displayed as the user information 1101. The user information 1101 may be displayed based on, for example, account information of the user registered with the database of the behavior sharing service 510.

The behavior status 1103 represents behavior of each user recognized by the behavior recognition function 320 as text. In the present embodiment, as shown by the behavior status 1103 in the illustrated example, motion of the user such as standing, running, walking, and sitting, being on a vehicle such as being on a train and being in a car, an operation related to a terminal such as sitting and looking at a terminal and leaving a terminal can be recognized as user's behavior. However, behavior that can be recognized by an embodiment of the present disclosure is not limited to such examples and can recognized various kinds of behavior as introduced by, for example, JP 2010-198595A and JP 2011-81431A.

The user object 1105 represents the behavior of each user recognized by the behavior recognition function 320 by a pose (shape) or motion thereof. That is, the user object 1105 is generated based on behavior information indicating user's behavior and displayed in a display unit to represent the user. As shown by the illustrated example, the user object 1105 may be, for example, a human type and represent user's behavior by taking a pose corresponding to the user's behavior (such as standing and running). Alternatively, when the user is in a vehicle, the user object 1105 may be represented by the shape of the vehicle. Also, when the user leaves a terminal or user's behavior is not recognized (unknown), the user object 1105 may be, instead of the shape of a person or vehicle, the shape of an unknown object or the shape of a terminal apparatus left inactive.

The behavior information use setting button 1107 is a button used by the user of the client apparatus 100 to turn on or off the behavior recognition by the behavior recognition function 320 or to set whether or not to make behavior information acquired by recognition open. While "always public" is selected in the illustrated example, other choices such as "off" (do not use behavior recognition) and "not public" (behavior recognition is used, but behavior information is open to nobody including users set to share) may be provided. When behavior information is open, publication limiting the time zone or the day of week like "7:00 to 21:00 every day" and "24 hours from Monday to Friday" or "24 hours on Saturdays and Sundays" may be settable.

The posting button 1109 is a button to activate the function for the user of the client device 100 to post a message on the social media 520. The message posted by the user is displayed on a posting history screen described later. In this manner, screen elements for the behavior sharing service 510 and screen elements for the social media 520 may be mixed on the display screen of the client apparatus 100.

The user of the client apparatus 100 can take a glimpse of the behavior status 1103 and the user object 1105 of many users through the list display screen 1100 as described above. In the list display screen 1100, for example, an individual information screen of each user may be displayed by selecting the behavior status 1103, the user object 1105, or a row of the list including these.

(3-2. Virtual Space Display Screen)

Figure 4:
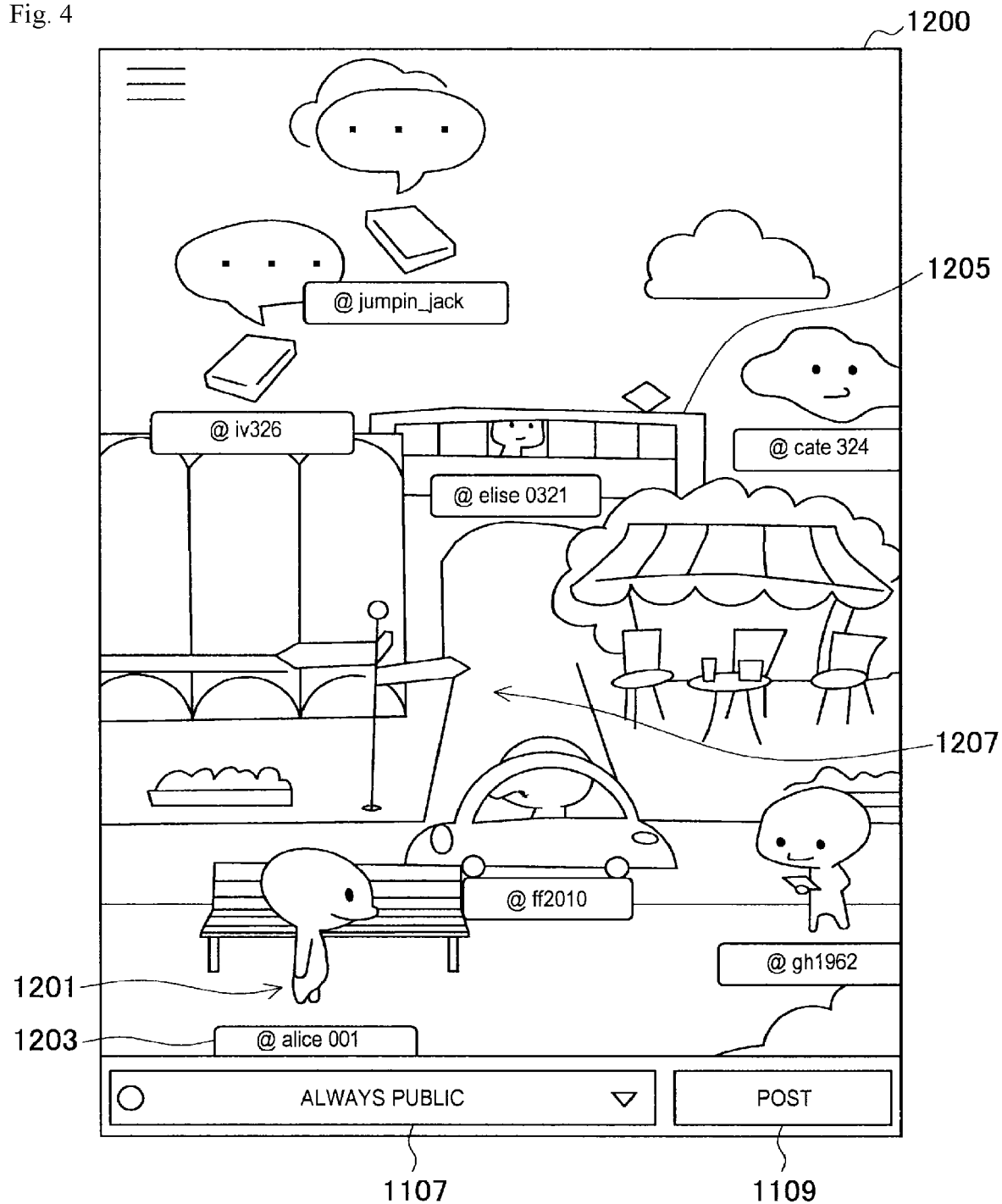
FIG. 4 is a diagram showing an example of a virtual space display screen in an embodiment of the present disclosure.

FIG. 4 is a diagram showing an example of a virtual space display screen in an embodiment of the present disclosure. Referring to FIG. 4, a virtual space display screen 1200 displayed in the display of the client apparatus 100 contains a user object 1201, user information 1203, a vehicle object 1205, and a virtual space 1207. Further in the virtual space display screen 1200, the behavior information use setting button 1107 and the posting button 1109 are displayed.

Incidentally, the virtual space display screen 1200 shown in FIG. 4 is displayed based on behavior information of each user at a different time from the time of the list display screen 1100 shown in FIG. 3. Therefore, the behavior state of each user in the example shown in FIG. 3 and the behavior state of each user shown in FIG. 4 do not necessarily match.

The user object 1201 is an object similar to that displayed on the list display screen 1100. That is, the user object 1201 is generated based on behavior information indicating behavior of each user and displayed in a display unit to represent the user. In the virtual space display screen 1200, behavior of each user is mainly displayed by the user object 1201. Each of the user objects 1201 may be arranged in a position inside the virtual space 1207 matching a pose (shape) or motion thereof. For example, the sitting user object 1201 is arranged near a bench and the standing user object 1201 is arranged by a roadside. The user object 1201 that is the shape of various vehicles in the list display screen 1100 may be arranged as a human type in a vehicle object described later. The user object 1201 in the shape of an unknown object or in the shape of a terminal left may be displayed in the air.

The user information 1203 contains, for example, as illustrated, a user ID. In addition or instead thereof, a user name or a thumbnail image may be displayed as the user information. In the virtual space display screen 1200 according to the present embodiment, only the user ID is displayed as the user information 1203 to avoid interfering with the display of the virtual space 1207 and the other user objects 1201.

The vehicle object 1205 is arranged in the virtual space 1207 and accommodates the user object 1201 of the user indicated that the user is in a vehicle based on behavior information. In the illustrated example, the vehicle object 1205 of a train and the vehicle object 1205 of a car are arranged in the virtual space 1207. In addition, a bus, a bicycle, an airplane, an elevator and the like may be displayed. The vehicle object 1205 is arranged in a position suitable to each vehicle in the virtual space 1207. For example, the vehicle object 1205 of a bus, a car, a bicycle and the like is arranged on a road, the vehicle object 1205 of a train is arranged on a track, and the vehicle object 1205 of an elevator is arranged inside a building.

The virtual space 1207 is a space in which the user object 1201 and the vehicle object 1205 described above are arranged. The virtual space 1207 may be configured based on a theme selected by the user of the client apparatus 100 from some themes prepared in advance. The virtual space 1207 may also contain, for example, elements to arrange the user object 1201 of various poses (shapes) and motions and various kinds of the vehicle objects 1205. In the illustrated example, for example, a bench to arrange the sitting user object 1201 and a road to arrange the vehicle object 1205 of a car are contained in the virtual space 1207.

As illustrated in FIG. 4, the behavior information use setting button 1107 and the posting button 1109 like in the list display screen 1100 described above may also be displayed in the virtual space display screen 1200. Further, in the virtual space display screen 1200, though not illustrated, another posting button may be displayed such that a snap shot of the virtual space 1207 including the user object 1201, the user information 1203, and the vehicle objects 1205 are acquired to post a message by the user with the snap shot as an attached image on the social media 520.

With the virtual space display screen 1200 as described above, the user of the client apparatus 100 can arrange and observe the user object 1207 of each user in the virtual space 1207 so that, for example, the user may have a feeling of togetherness for other users as if the user lives in the same town as other users. In the virtual space display screen 1200, for example, an individual information screen of each user may be displayed by selecting the user object 1201 or the user information 1203.

Figure 5:
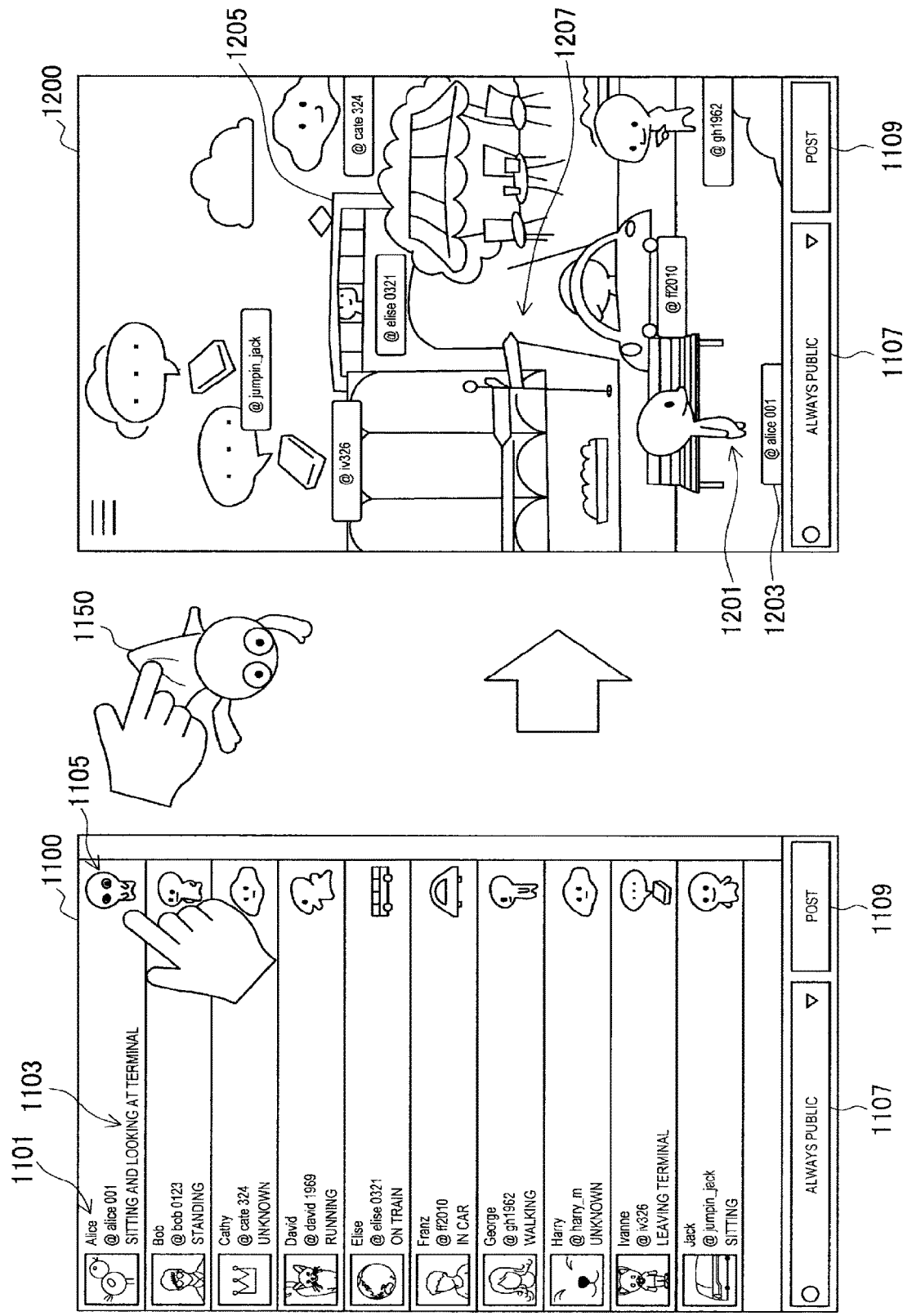
FIG. 5 is a diagram illustrating a relationship between the list display screen and the virtual space display screen in an embodiment of the present disclosure.

FIG. 5 is a diagram illustrating a relationship between the list display screen and the virtual space display screen in an embodiment of the present disclosure. In the present embodiment, as shown in FIG. 5, the user can move the user object 1105 displayed on the list display screen 1100 to the virtual space display screen 1200 by the so-called drag & drop operation to add the user object 1201 of the user to the virtual space display screen 1200. In FIG. 5, a user object 1150 being dragged is displayed. While being dragged from the list display screen 1100 to the virtual space display screen 1200 in this manner, the user object 1150 may be displayed in a pose (shape) or motion that is different from that of the user object 1105 or the user object 1201.

In the present embodiment, as shown by the illustrated example, only a portion of users whose behavior status 1103 or user object 1105 is displayed on the list display screen 1100 is also displayed on the virtual space display screen 1200 as the user object 1201. For example, an upper limit may be set to the number of the user objects 1201 that can be added to the virtual space display screen 1200 in order to prevent interference of the user objects 1201 with each other in the virtual space display screen 1200 and also to prevent the virtual space 1207 from being made harder to view. In other embodiments, it may be possible to cause the virtual space display screen 1200 to display all users whose behavior status 1103 or user object 1105 is displayed on the list display screen 1100 as the user objects 1201.

(3-3. Individual Information Screen)

Figure 6:
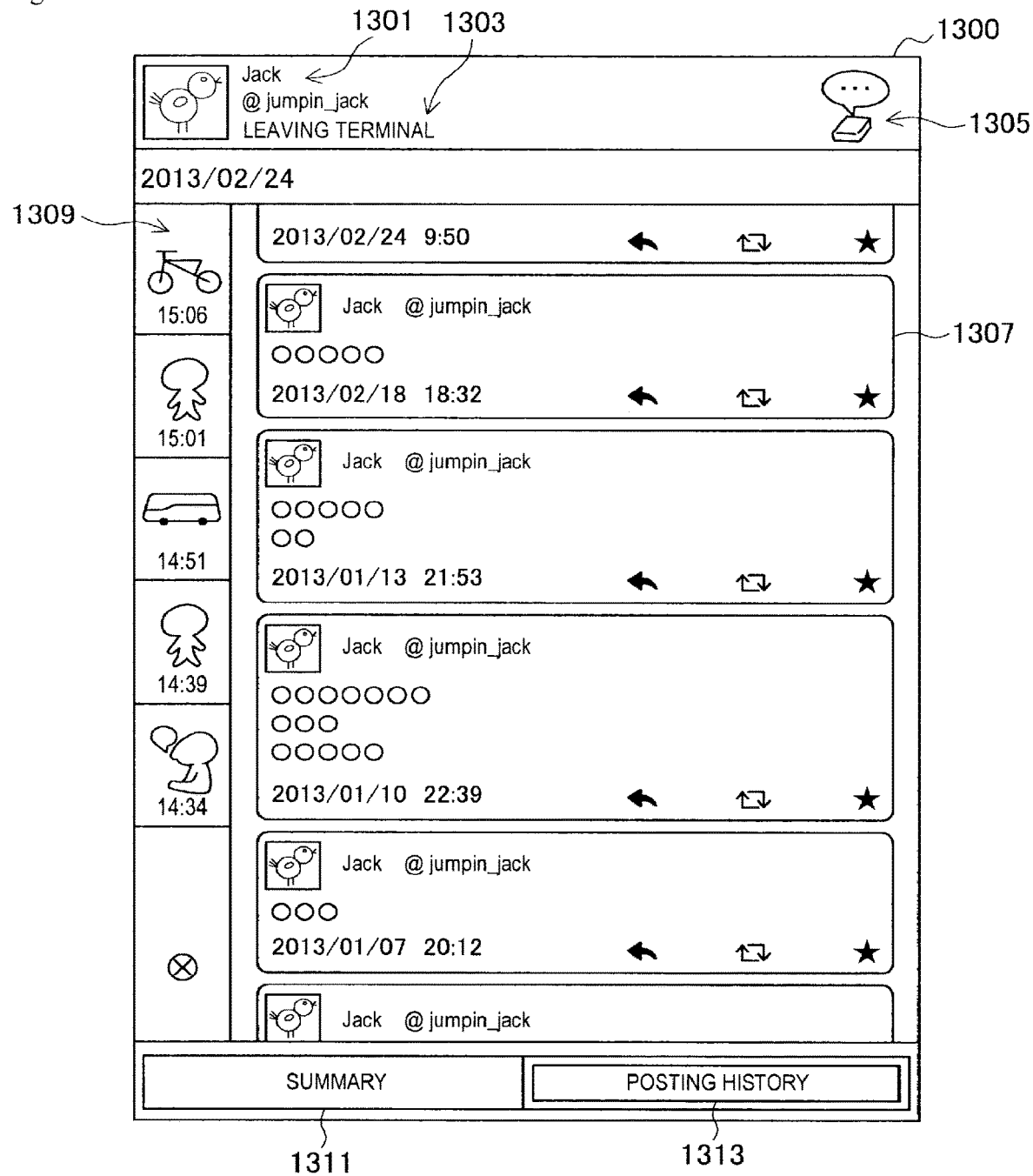
FIG. 6 is a diagram showing an example of a posting history screen in an embodiment of the present disclosure.

FIG. 6 is a diagram showing an example of a posting history screen in an embodiment of the present disclosure. Referring to FIG. 6, a posting history screen 1300 displayed in the display of the client apparatus 100 includes user information 1301, behavior status 1303, a user object 1305, a posting message 1307, a behavior icon 1309, a summary button 1311, and a posting history button 1313.

The posting history screen 1300 is an individual information screen in the present embodiment. The posting history screen 1300 can be displayed by, for example, selecting the behavior status 1103, the user object 1105, or a row of the list containing these in the list display screen 1100. The posting history screen 1300 may also be displayed by selecting the user object 1201 or the user information 1203 in the virtual space display screen 1200.

The user information 1301 may be the same as the user information 1101 of the list display screen 1100 described above with reference to FIG. 3. However, the posting history screen 1300 is an individual information screen of each user and thus, the user information 1301 is displayed for one user.

The behavior status 1303 and the user object 1305 may be the same as the behavior status 1103 and the user object 1105 of the list display screen 1100. However, the posting history screen 1300 is an individual information screen of each user and thus, the behavior status 1303 and the user object 1305 are displayed for one user.

The posting message 1307 is a message posted on the social media 520 by the user displayed on the posting history screen 1300. The posting messages 1307 are arranged, for example, in a chronological order and displayed successively by the display being scrolled by the user.

The behavior icon 1309 is an icon indicating the user's behavior recognized at a time closest to the time when the posting message 1307 is posted. The behavior icon 1309 may be, for example, the same icon as the one for the user object 1105 (assumed to be) displayed when the posting message 1307 is posted or an icon indicating user's behavior determined by further processing. In this case, the behavior icon 1309 may show different behavior from the user object 1105 when the posting message 1307 is posted.

The summary button 1311 is a button to switch the display to a behavior summary screen 1400 described later. The posting history screen 1300 and the behavior summary screen 1400 are displayed as individual information screens of the user in the present embodiment and these screens can mutually be switched by using the summary button 1311 and the posting history button 1313. Therefore, the posting history button 1313 is displayed in a selected state in the posting history screen 1300.

The user of the client apparatus 100 can refer to behavior of each user together with messages posted by the user through the posting history screen 1300 as described above.

Figure 7:
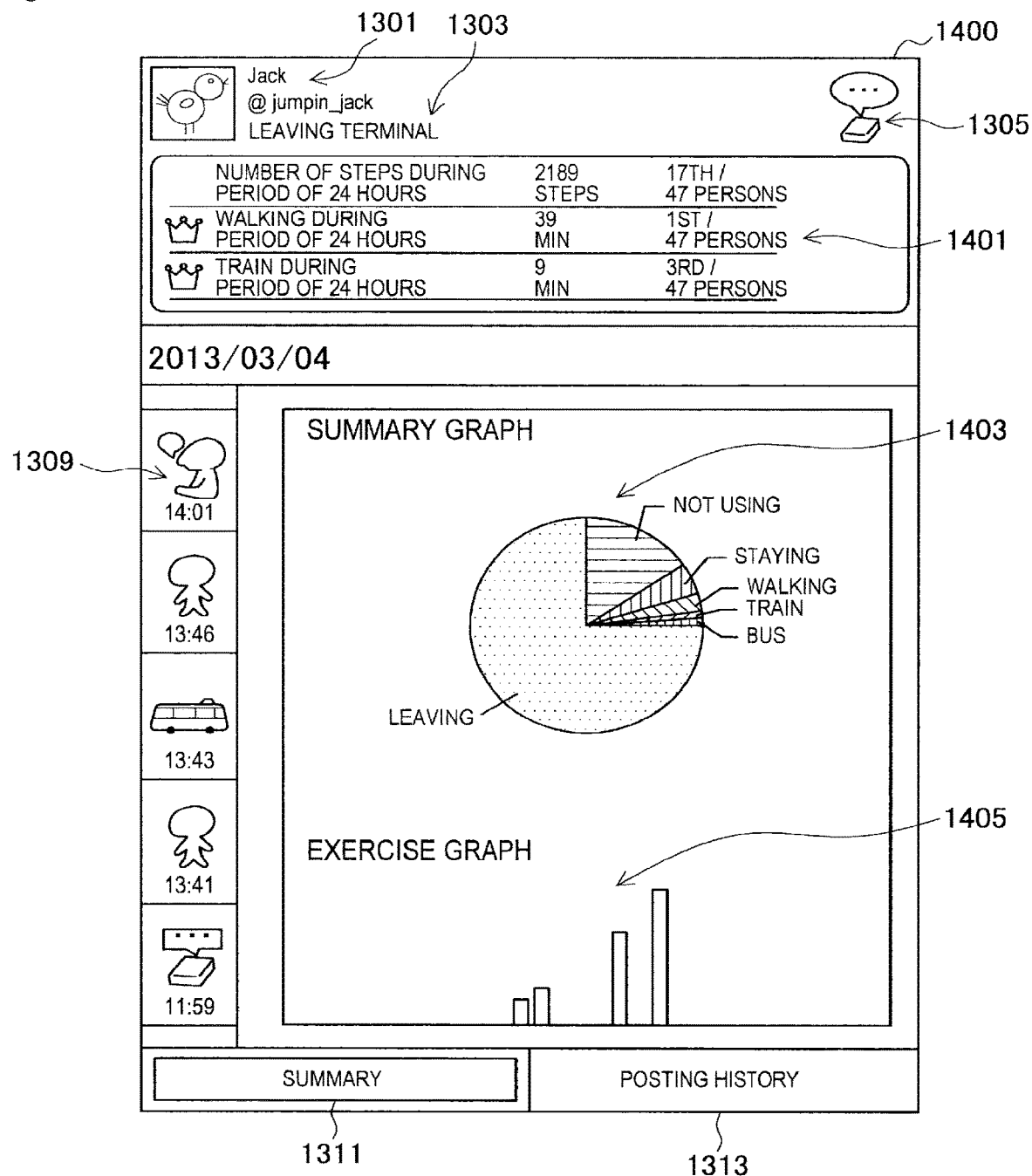
FIG. 7 is a diagram showing an example of a behavior summary screen in an embodiment of the present disclosure.

FIG. 7 is a diagram showing an example of the behavior summary screen in an embodiment of the present disclosure. Referring to FIG. 7, in addition to elements similar to those of the posting history screen 1300 including the user information 1301, the behavior status 1303, the user object 1305, the behavior icon 1309, the summary button 1311, and the posting history button 1313, ranking 1401, a summary graph 1403, and an exercise graph 1405 are displayed on the behavior summary screen 1400 displayed in the display of the client apparatus 100.

The behavior summary screen 1400 is an individual information screen separate from the posting history screen 1300 in the present embodiment. Like the posting history screen 1300, the behavior summary screen 1400 may be displayed by, for example, the behavior status 1103, the user object 1105 from the lit display screen 1100, or by selecting a row of the list including these. The behavior summary screen 1400 may also be displayed by selecting the user object 1201 or the user information 1203 from the virtual space display screen 1200. As described above, the posting history screen 1300 and the behavior summary screen 1400 can be switched one another and displayed by using the summary button 1311 and the posting history button 1313.

The ranking 1401 is displayed based on, for example, ranking information generated by the behavior sharing service 510. The ranking may contain items extracted by performing statistical processing of behavior information of users like, for example, the illustrated examples "Number of steps during the period of 24 hours", "Walking time during the period of 24 hours", and "Riding time of trains during the period of 24 hours". The update interval of the ranking 1401 can freely be set. The update interval may not necessarily be related to the sample width (24 hours in the above examples) of ranking items. In the above examples, for example, the ranking 1401 may be updated on a daily basis (24 hours) and may be updated on an hourly basis. If, for example, the ranking 1401 is updated at 10:00, "24 hours" may mean from 10:00 of the previous day to 10:00 of the day.

The summary graph 1403 is a graph summarizing the user's one-day behavior. In the illustrated example, the types of behavior of the user recognized in some day (Mar. 4, 2013 in the illustrated example) are displayed as a graph. The exercise graph 1405 is a graph showing an exercise state estimated from the user's one-day behavior. Though interrupted in the middle, a graph showing, for example, a walking time or a running time of the user hourly is shown as the exercise graph 1405. Information representing user's behavior by summarizing at predetermined time intervals as shown above is not limited to the summary graph 1403 and the exercise graph 1405 in the illustrated example and may be any type of graph. In addition, the time interval to summarize user's behavior is not limited to one day and may be a longer time such as one week or one month or a shorter time such as 12 hours or six hours.

The behavior icon 1309 is, like the one displayed on the posting history screen 1300, an icon showing user's behavior. In the behavior summary screen 1400, however, an icon showing the user's behavior recognized in the time (Mar. 4, 2013 in the illustrated example) intended for the information representing by summarizing user's behavior such as the summary graph 1403 and the exercise graph 1405 may be shown as the behavior icon 1309.

The user of the client apparatus 100 can refer to information summarizing and expressing behavior of each user in a predetermined time through the behavior summary screen 1400 as described above.

(4. Commentary Based on Behavior Recognition)

Subsequently, commentary generated based on user's behavior recognition in an embodiment of the present disclosure will further be described. In the present embodiment, as described above, in addition to mutually sharing behavior among users, commentary on behavior of each user is generated and information containing an image generated based on the commentary is posted on the social media 520.

(4-1. Display Example of Commentary)

Figure 8:
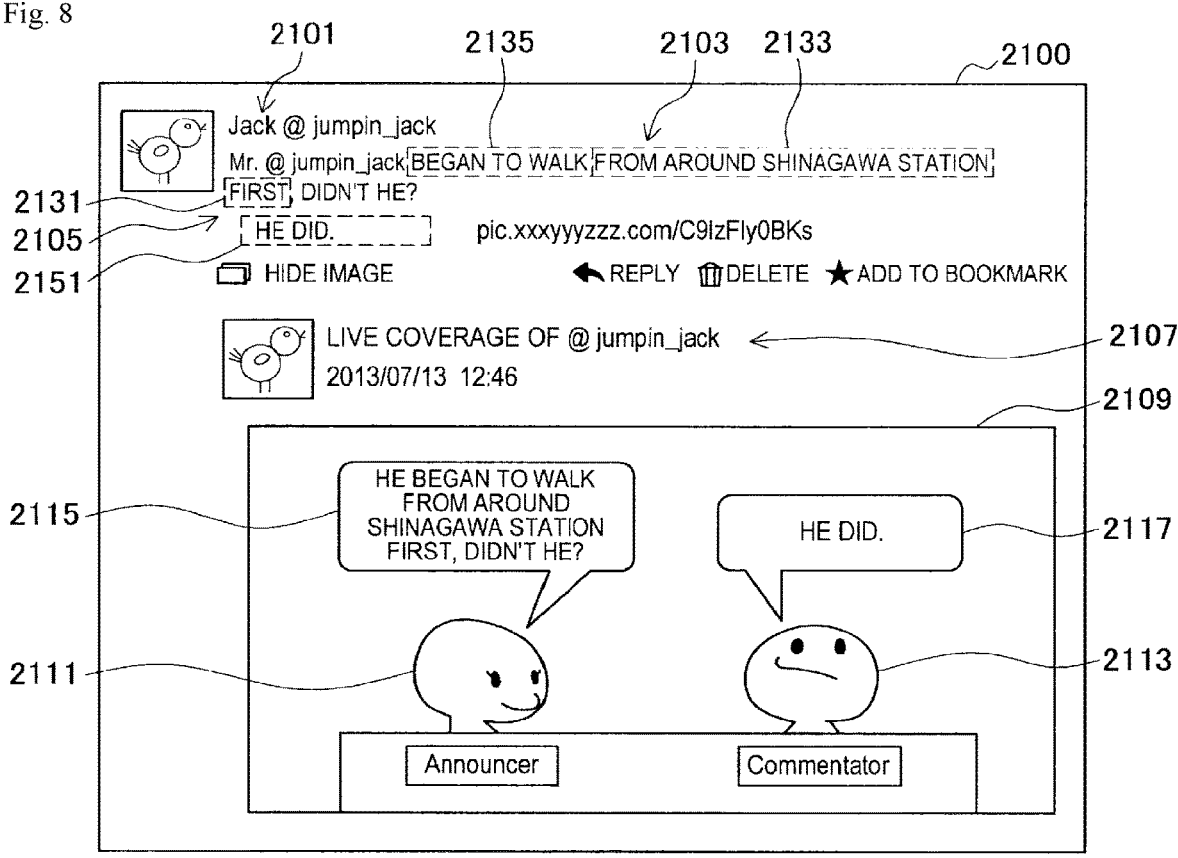
FIG. 8 is a diagram showing a display example of commentary generated based on user's behavior recognition in an embodiment of the present disclosure.

FIG. 8 is a diagram showing a display example of commentary generated based on user's behavior recognition in an embodiment of the present disclosure. Referring to FIG. 8, commentary information 2100 contains user information 2101, descriptive text 2103, commenting text 2105, a title 2107, and a commentary image 2109.

The commentary information 2100 is displayed in, for example, a time line of the social media 520 based on information (second information) output by the output function 470 as described above. In the illustrated example, the commentary information 2100 contains messages and images. In other examples, the commentary information 2100 may contain only either of messages or images.

The user information 2101 contains, for example, as illustrated, a thumbnail image, a user name, and a user ID. Any one of these may be displayed as the user information 2101 or, in addition to these, other information may be displayed as the user information 2101. The user information 2101 may be displayed based on, for example, account information of the user registered with a database of the social media 520.

The descriptive text 2103 is a first portion contained in the commentary and a descriptive commentary on user's behavior. In the illustrated example, the descriptive text 2103 simply describes, like "@jumpin_jack San Ha Mazu Shinagawaeki Atarikara Arukihajime Mashitane (Mr. @jumpin_jack began to walk from around Shinagawa Station first, didn't he?)", the target user name of the commentary, the current location of the user, and the behavior of the user. The sentence includes, for example, subsequent to the main part of "@jumpin_jack San Ha (Mr. @jumpin_jack)", an introductory part 2131 ("Mazu (first)) selected or decided based on the user condition or commentary history, a position identification part 2133 ("Shinagawaeki Atarikara" (from around Shinagawa Station)), and a behavior identification part 2135 ("Arukihajime Mashita ne" (began to walk, didn't he?)). A concrete example based on each of the above parts will be described later.

In the illustrated example, the descriptive text 2103 hardly contains additional information. However, in other examples, the descriptive text 2103 may also contain additional information. If, for example, the user continues certain behavior for an extended predetermined time, the descriptive text 2103 may contain, for example, information of the time in which the behavior continues like "Ichijikan Hasshite Imasu ne (you are running for one hour, aren't you?)". If, for example, the user is walking/running, the way of walking/running may be estimated based on the number of steps, the pace or the like in the unit time to add a corresponding sentence to the behavior identification part 2135. If, for example, the number of steps in the unit time is small, the user is estimated to be walking slowly and ""Daradara" Aruite Imasu ne (you are walking leisurely, aren't you?)" may be generated as the behavior identification part 2135. Also, if the number of steps in the unit time is large, "Sassoto Aruite Imasu ne (you are walking with briskly, aren't you?)" may be generated as the behavior identification part 2135. If the pace is narrow and the number of steps in the unit time is large, ""Tokotoko" Aruite Imasu ne (you are walking trottingly, aren't you?)" may be generated as the behavior identification part 2135. The threshold for the determination of the number of steps or the pace for the above examples may be personalized based on the average value of each user.

The commenting text 2105 is a second portion contained in the commentary and a commenting commentary on user's behavior. In the illustrated example, the commenting text 2105 adds a simple comment like "Honto Desu ne (He did)" to the description of user's behavior by the descriptive text 2103. The sentence contains, for example, a comment portion 2151 "Honto Desu ne (He did)" selected or decided based on the user condition or commentary history. A concrete example of the comment portion 2151 will be described later.

In the illustrated example, the commenting text 2105 contains additional information in the form of a comment on the user's behavior shown by the descriptive text 2103. Though the comment in the illustrated example contains no substantial meaning, the commenting text 2105 may contain more significant, additional information in other examples. For example, the commenting text 2105 may contain information based on statistical information obtained from the history of the user's past behavior. If, for example, the current behavior of the user habitually continues while exceeding a predetermined period, the comment portion 2151 may be generated based on information of the period in which the behavior continues like "Isshuukan Tsuzuite Imasu ne (It's been one week, hasn't it?)". If, for example, the longest duration in the history regarding the user's behavior currently which continues while exceeding the predetermined period is recorded, the comment portion 2151 may be generated based on information of the longest duration in the past like "Koremadeno Saichou ha Nisenjuuni Nen Kugatsu Juushichi Nichi No Nijikan Nijuuroppun Desu ne (Your longest duration is 2 hours 26 minutes recorded on Sep. 17, 2012, isn't it?)".

The descriptive text 2103 and the commenting text 2105 described above forms a dialog. That is, a commentary generated on user's behavior at some point in time contains the descriptive text 2103 and the corresponding commenting text 2105. In other examples, a commentary containing a longer dialog such as descriptive text (first time) and commenting text and descriptive text (second time) on user's behavior at some point in time may be generated.

The title 2107 is set based on, for example, as will be described later, input of the user when commentary is started and may be displayed, as illustrated, as a caption of the commentary image 2109. The title 2107 may be displayed, for example, as illustrated, together with the icon of the user information or, as illustrated, together with the date and time.

The commentary image 2109 is an image generated by the image generation function 450. In the illustrated example, a first speaker image 2111 and a second speaker image 2113 representing an announcer and a commentator in a commentary booth respectively are drawn in the commentary image 2109 and a first balloon 2115 and a second balloon 2117 are drawn as a dialog therebetween. By including, for example, the commentary image 2109 in the commentary information 2100, an atmosphere can be created as if live coverage is given on the user's activity and real-time properties can effectively be represented for other users viewing the commentary information.

A text corresponding to the descriptive text 2103 and the commenting text 2105 is displayed in the first balloon 2115 and the second balloon 2117 respectively. Because the space of the balloon is limited, the text displayed in each balloon may be abbreviated when compared with the descriptive text 2103 or the commenting text 2105. In the illustrated example, regarding the text displayed in the first balloon 2115, the main part ("@jumpin_jack San Ha (Mr. @jumpin_jack)") of the descriptive text 2103 is omitted.

(4-2. Configuration Example of Descriptive Commentary)

(When the User's Behavior Changes)

As described above, when, for example, the user's behavior indicated by behavior recognition results by the behavior recognition function 320 changes, the commentary generation function 430 generates commentary. This case includes, in addition to a case when new behavior of the user is recognized by the behavior recognition function 320, a case when user's behavior once recognized by the behavior recognition function 320 is corrected.

For example, regarding user's behavior recognized first after starting commentary, the commentary generation function 430 selects text such as "Mazu (first)", "Sousouni (right away)", "Hitomazu (for a while)", and "Suguni (immediately)" stored in the vocabulary DB 440 as the introductory part 2131. In addition, the commentary generation function 430 configures the behavior identification part 2135 with wording having a meaning of "begin to" like "Jitenshani Norihajimeta Youdesu (seems to begin to ride a bicycle)" and "Tatazumi Hajimemashita (begins to stay there)". The text of the position identification part 2133 may have the end of a phrase changing in accordance with content of behavior represented by the behavior identification part 2135 and whether to have a meaning of "begin to" like changing the text of the position identification part 2133 to "Shinagawaeki Atarikara (from around Shinagawa Station)" if the behavior identification part 2135 is "Jitenshani Norihajimeta Youdesu (seems to begin to ride a bicycle)" and to "Shinagawaeki Atarikara (from around Shinagawa Station)" if the behavior identification part 2135 is "Tatazumi Hajimemashita (begins to stay there)".

On the other hand, if the user's behavior changes halfway through commentary, the commentary generation function 430 select text such as "Soshite (then)", "Sarani (further)". "Tsugini (next)" or the like stored in the vocabulary DB 440 as the introductory part 2131. The commentary generation function 430 configures the behavior identification part 2135 with wording that does not necessarily have a meaning of "begin to" like "Jitenshano Youdesu (seems to be a bicycle)" and "Tatazunde Imasu (staying there)". The position identification part 2133 is like the example of behavior recognized first. If the user's behavior once recognized is corrected, the commentary generation function 430 selects a text such as "Machigaide (in error)", "Chigatte Imashita (was not correct)", "Ayamari Deshita (was an error)", and "Machigai Deshita (was in error)" stored in the vocabulary DB 440 as the introductory part 2131. The position identification part 2133 and the behavior identification part 2135 are the same as in the example in which a behavior changes.

(When User's Behavior Continues)

The commentary generation function 430 also generates commentary when, for example, user's behavior indicated by behavior recognition results of the user by the behavior recognition function 320 does not change and continues while exceeding a predetermined time.

In this case, the commentary generation function 430 selects a text such as "Mada (still)", "Shibaraku (for a while)", "Sakkikara (for some time)" or the like stored in the vocabulary DB 440 as the introductory part 2131. If the user's behavior continues still longer, the commentary generation function 430 select a text such as "Zuibun Nagaku (for quite a long time)", "Sugoku Nagaku (for a very long time)", "Daibu Nagaku (for a considerably long time)" or the like stored in the vocabulary DB 440 as the introductory part 2131. The commentary generation function 430 also configures the behavior identification part 2135 with wording having a meaning of "continue to" like "continue to ride a bicycle" and "continue to walk". The position identification part 2133 is the same as in the example in which the behavior changes as described above.

The current location (specific place name) of the user contained in the position identification part 2133 is acquired by, for example, performing inverse geo-cording based on information of the longitude and the latitude acquired by a GPS sensor contained in the sensor 310. The current location of the user may be represented concretely by, like the illustrated example, the station name, landmark name, or other place names or abstractly like "at home" and "workplace". The user may be allowed to select the representation method of the current location.

(4-3. Configuration Example of Commenting Commentary)

A commenting commentary illustrated as the descriptive text 2103 in the commentary information 2100 shown in FIG. 8 may be generated based on conditions that are different from those of, for example, the above descriptive commentary. As an example, conditions for generating a commenting commentary are shown below. The described conditions for generating a commenting commentary may be applied to some example preferentially in the order of description.

First, a commenting commentary may be generated depending on whether user's behavior is novel. If, for example, the user's behavior is novel (for example, when a ride in an elevator, which is difficult to be recognized by behavior recognition, is recognized or when a ride in a vehicle other than the train, bus, and car is recognized), the commentary generation function 430 may select a text such as "Kitah (Oh, My God!)", "Koreha . . . (This is it!)", "Oh, Sugoi . . . (Oh, wonderful!)" or the like stored in the vocabulary DB 440 as the comment portion 2151.

Next, a commenting commentary may be generated depending on whether a commentary is generated based on matching of user's behavior to a predetermined pattern. When, for example, commentary is generated because of an occurrence of the behavior pattern of "changing vehicles" described above, the comment portion 2151 such as "Norikae Desu ne (You are changing vehicles, aren't you?)" or "Norikae Kana?(Changing vehicles?)" is generated. In this case, for example, recognized behavior of the user is directly described in a descriptive commentary. When changing vehicles, for example, commentary is successively generated with changes of behavior such as a vehicle, walking, standing still, and a vehicle and when the behavior pattern of "changing vehicles" is determined in the last "vehicle", a commenting commentary containing the comment portion 2151 such as "Norikae Desu ne (You are changing vehicles, aren't you?)" is generated.

Next, a commenting commentary may be generated in accordance with duration of the user. When, for example, commentary is generated because of continuation of user's behavior for an extended predetermined time, the comment portion 2151 such as "Nagai Desu ne (It's so long, isn't it?)" may be generated in accordance with duration. If the user's behavior continues still longer, no commenting commentary may be generated and the second speaker image 2113 may not be displayed in the commentary image 2109 contained in the commentary information 2100. Such a display represents the fact that because the user continues the same behavior for so long, the commentator became bored and went away. As another representation, an act in which the second speaker image 2113 starts to operate a smartphone (doing something other than commenting) may be displayed.

Next, a commenting commentary may be generated in accordance with the time zone in which commentary is generated. When, for example, commentary is generated in the morning, the comment portion 2151 may be text exchanging greetings in the morning such as "Asa Desune (It's a morning)" and "Ohayou Gozaimasu (Good morning)" regardless of the recognized behavior of the user. When, for example, commentary is generated at midnight, the comment portion 2151 such as "Konbanwa (Good evening)" and "Ayashii Desune (It's strange)" (when, for example, the user exhibits behavior normally not exhibited at midnight) may be generated. Time zones used as conditions for generating a commenting commentary may intermittently be set like setting 5:00 to 9:59 as the morning, 10:00 to 14:59 as the daytime, 17:00 to 22:59 as the night, and 23:00 to 2:59 as the midnight in 24 hours. A time to which no time zone is set is a time for which the time zone changes depending on circumstances. By avoiding setting a time zone necessarily, forcibly to all time zones, a commenting commentary when referring to the time zone can be generated more naturally.

When none of the above conditions is met, a commenting commentary may be generated as a simple accompaniment like "Hai (Yes)", "Sou Desume (Exactly)", and "Hontou Desune (It's true)". In each case described above, a commenting commentary may further include additional information (such as information based on statistical information) described above.

As a different example from the above examples, commentary may not necessarily be divided into a descriptive portion and a commenting portion. For example, commentary in an image may be represented by balloons associated with a single speaker so that the commentary proceeds as a single-speaker narrative. In addition, information contained in commentary is not limited to the above examples and, for example, commentary such as "Tatta Ima @Johnny_B San Kara "Ganbare" to Otayoriga (Just now, we received a mail from Mr. @Johnny_B saying do not give up)" may be generated based on posting on the social media 520 by another user. In addition, for example, commentary such as "Amenonaka Ganbarune (You are working hard in the rain)" may be generated based on environment information (such as the weather and temperature) of the user acquired from another service.

In the above examples, mainly a case when text commentary is generated is described, but in other examples, instead of the text commentary or in addition thereto, an audio commentary may be generated. Content of the audio commentary may be a text as displayed in the first balloon 2115 and the second balloon 2117 in the above example or a different text. The posting destination of messages and images may not be the social media 520 and may be a unique service that is different from existing services.

(5. Commentary Based on Posting)

Subsequently, commentary generated based on posting on social media by the user in an embodiment of the present disclosure will further be described. In the present embodiment, as described above, commentary is also generated when the user posts a message or an image on social media and/or an image is captured by the client apparatus 100 and information containing an image generated based on the commentary may be posted on the social media 520.

(5-1. Display Example of Commentary)

Figure 9:
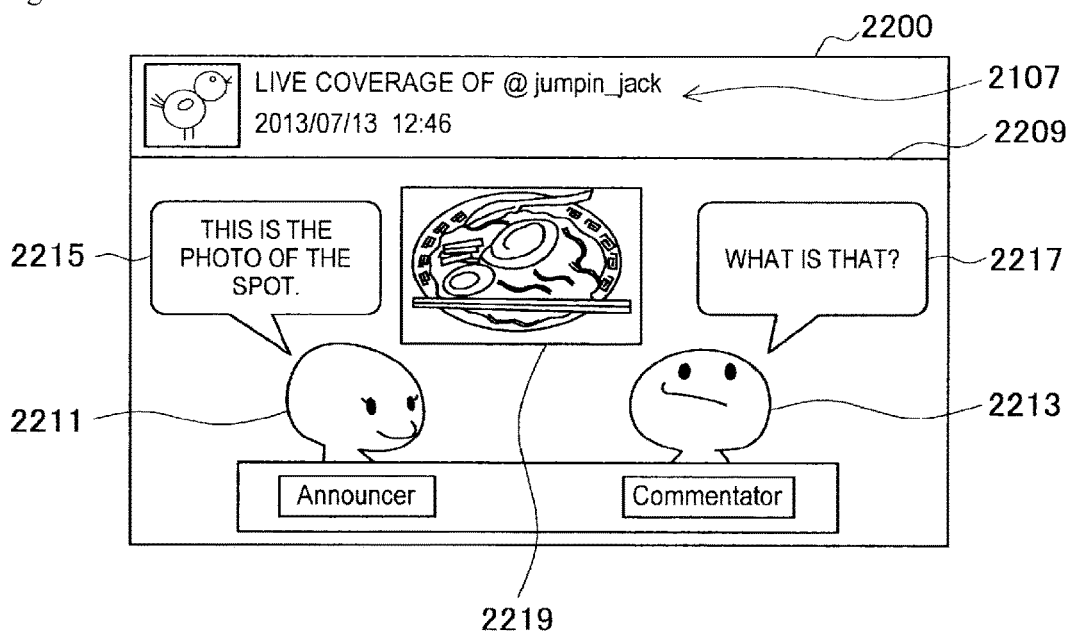
FIG. 9 is a diagram showing a display example of commentary generated based on user's posting of an image in an embodiment of the present disclosure.

FIG. 9 is a diagram showing a display example of commentary generated based on user's posting of an image in an embodiment of the present disclosure. Referring to FIG. 9, commentary information 2200 includes the title 2107 similar to that of commentary based on the above behavior recognition and a commentary image 2209. The commentary image 2209 includes a first speaker image 2211, a second speaker image 2213, a first balloon 2215, and a second balloon 2217, as well as a posted image 2219.

Also the commentary information 2200 is displayed in, for example, a timeline of the social media 520 based on information (second information) output by the output function 470. In the illustrated example, the commentary information 2200 includes the title 2107 and the commentary image 2209. In other examples, the commentary information 2200 may further include the user information 2101, the descriptive text 2103, the commenting text 2105 and the like The image 2219 is, as described above, an image posted on the social media 520 by the user. In the illustrated example, the image 2219 is arranged near an intermediate position between the first speaker image 2211 and the second speaker image 2213 in the commentary image 2209 and the commentary image 2209 represents how an announcer and a commentator in the commentary booth are talking about the image 2219. In the commentary image 2209, the first speaker image 2211 and the second speaker image 2213 may be drawn as if to focus on, for example, the image 2219.

A text of commentary displayed by the first balloon 2215 and the second balloon 2217 may be configured in connection with the image 2219. In the first balloon 2215, for example, in addition to "Korega Genbano Shashindesu (This is the photo of the spot)" of the illustrated example, for example, wording indicating the discovery of the subject of the image 2219 like "Korega Shoukono Shinada! (This is a piece of evidence!)", "Korega Mitsukattazo! (This is a find!)", and "Konna Monoga! (Such a thing is found!)" is displayed. In the second balloon 2217, wording referring to the image 2219 in accordance with content of the first balloon 2215 like "What is this?" in the illustrated example is displayed.

As another example, if, for example, the commentary generation function 430 can identify the subject of the image 2219 by performing an image analysis, commentary referring to the subject concretely may be generated. If, for example, in the example shown in FIG. 9, the subject is identified as Chinese soup noodles, wording such as "This is a Chinese soup noodle" may be displayed in the first balloon 2215 and "Looks delicious" in the second balloon 2217.

(6. Summary Representation of Commentary)

Subsequently, examples of summarizing and representing a plurality of commentaries generated in a predetermined time in an embodiment of the present disclosure will be described. In the present embodiment, as described above, an image summarizing and representing a plurality of commentaries generated in a predetermined time can be generated by the image generation function 450. The summary image may be video (animation) in which the commentary images 2109, 2209 described with reference to FIGS. 8 and 9 are chronologically arranged. Also, the summary image may be, for example, an image that is generated separately from commentary images and summarizes and represents information contained in a plurality of commentaries generated in a predetermined time. Hereinafter, some examples of the summary image generated separately from commentary images will be described.

(First Example of Image)

Figure 10:
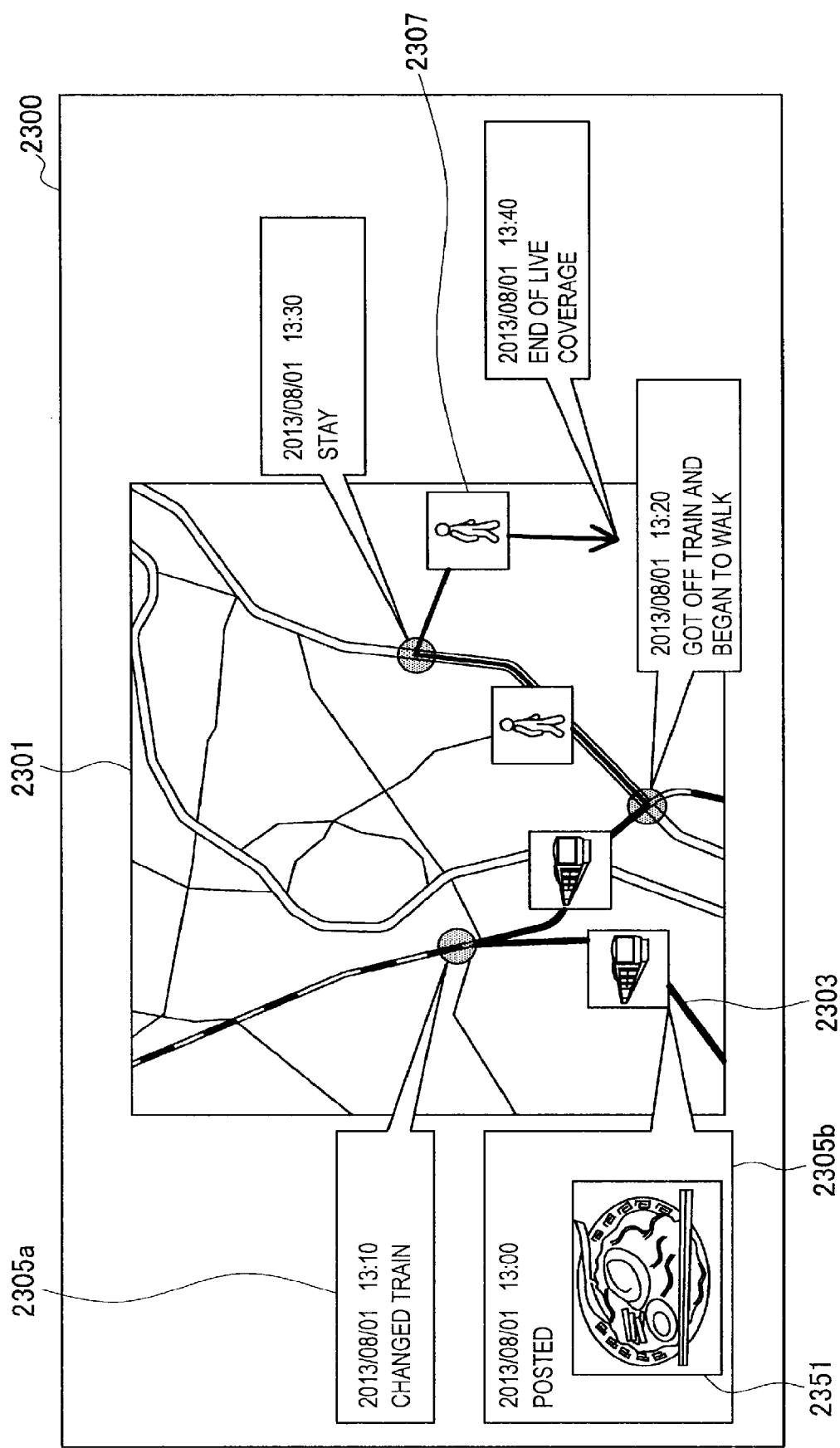
FIG. 10 is a diagram showing a first example of a commentary summary image displayed in an embodiment of the present disclosure.

FIG. 10 is a diagram showing a first example of a commentary summary image displayed in an embodiment of the present disclosure. Referring to FIG. 10, a summary image 2300 includes a map 2301, a route display 2303, a behavior display 2305, and a behavior icon 2307.

In the illustrated example, the map 2301 is a geographical map based on actual measurements and may be acquired from an outside service. In this specification, such a map is also called an actual map. The route display 2303 is displayed on the map 2301 based on the history of position information of the user. The route display 2303 may be displayed based on position information used when commentary is generated by the commentary generation function 430 or based on position information separately acquired continuously including a period when no commentary is generated.

The behavior display 2305 is displayed in a position where user's behavior changes or commentary is generated based on posts on the social media 520. In the illustrated example, the behavior display 2305 is illustrated as behavior displays 2305*a*, 2305*b*. The behavior display 2305*a* is displayed in a position where commentary is generated indicating the change of user's behavior based on results of behavior recognition. Here, as described above, a label is set to a sequence of behavior of "changing vehicles" based on matching of the user's behavior to a predetermined pattern. Therefore, the behavior display 2305*a* is displayed for a sequence of behavior of "changing vehicles", instead of each of behaviors such as "walking" and "standing still". On the other hand, the behavior display 2305*b* is displayed in a position where commentary is generated based on posts on the social media 520. For example, a reduced image of a posted image 2351 may be displayed in the behavior display 2305*b*.

The behavior icon 2307 is displayed in a position where commentary is generated based on, for example, continuation of user's behavior. In the illustrated example, the behavior icon 2307 is displayed in a position where commentary is generated because the user's state of being on a train or walking for an extended predetermined time (for example, five minutes). Image data of the behavior icon 2307 in accordance with a content of commentary is stored in, for example, the image DB 460.

(Second Example of Image)

Figure 11:
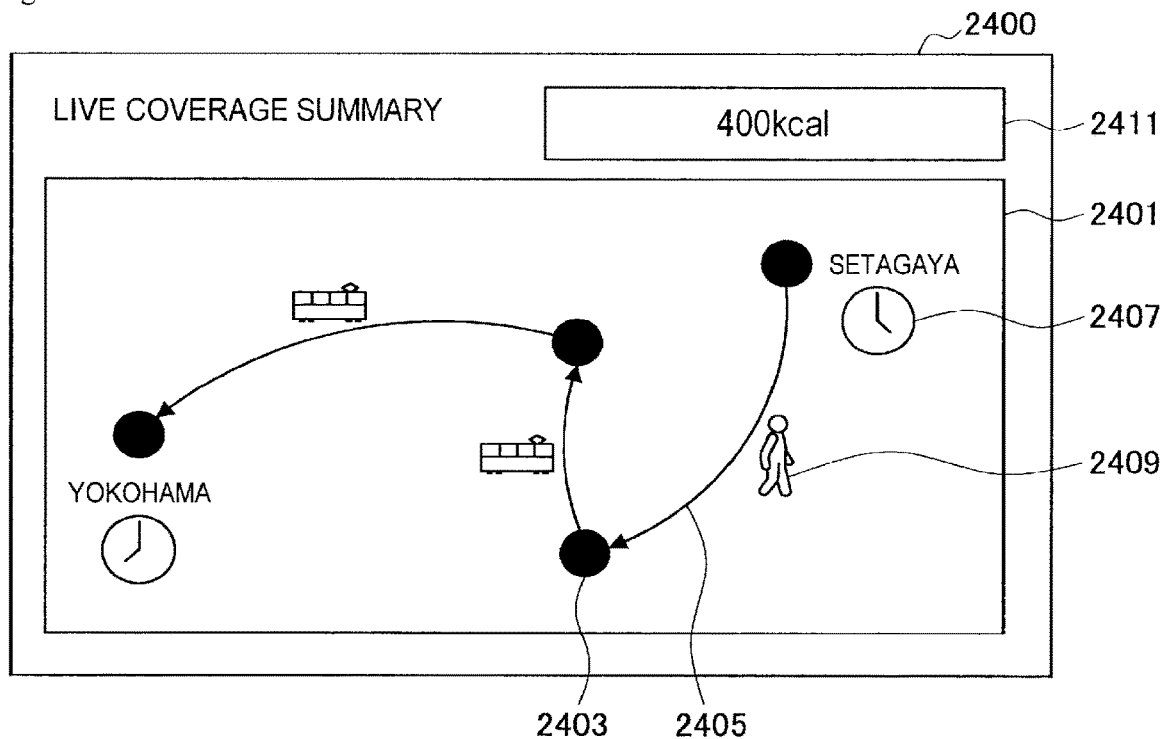
FIG. 11 is a diagram showing a second example of a commentary summary image displayed in an embodiment of the present disclosure.

FIG. 11 is a diagram showing a second example of the commentary summary image displayed in an embodiment of the present disclosure. Referring to FIG. 11, a summary image 2400 includes a map 2401, a point display 2403, a route display 2405, a time icon 2407, a behavior icon 2409, and a consumed calorie display 2411.

In the illustrated example, the point display 2403 is displayed on the map 2401 as a position of the user when commentary is generated, but other map elements, for example, a mad or a railway is not displayed. The point display 2403 is arranged based on, for example, information of the latitude and the longitude of the user when commentary is generated, but the route display 2405 does not necessarily correspond to a moving route of the user between the point displays 2403. The route display 2405 connects the point displays 2403 by, for example, a line that looks like a handwritten line. That is, when compared with the map 2301 shown in the example of FIG. 10, the element of the actual moving route of the user is considered to be abstracted in the map 2401. In this specification, a map from which at least a portion of elements of an actual map is abstracted is also called a virtual map.

The time icon 2407 shows the time when commentary is generated in at least a portion of the point displays 2403. The behavior icon 2409 represents behavior of the user represented in commentary. In the illustrated example, the behavior icon 2409 showing walking or a ride on a train corresponding to the route display 2405 is shown to indicate that the user's behavior shown by commentary generated in each of the point displays 2403 is walking or a ride on a train.

The consumed calorie display 2411 is displayed as additional information in the summary image 2400. If, for example, an acceleration sensor contained in the sensor 310 is used, the state of exercise of the user can be grasped and thus, the user's consumed calories in a predetermined time can be estimated.

(Third Example of Image)

Figure 12:
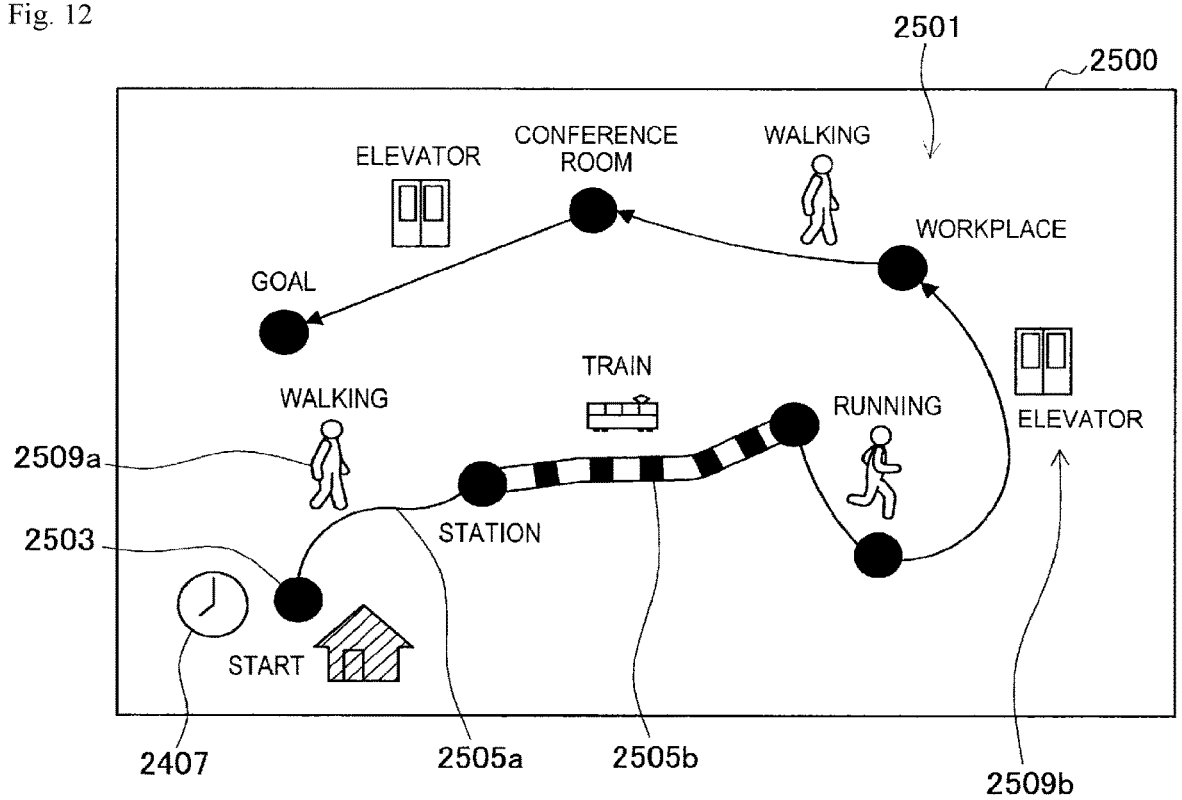
FIG. 12 is a diagram showing a third example of a commentary summary image displayed in an embodiment of the present disclosure.

FIG. 12 is a diagram showing a third example of the commentary summary image displayed in an embodiment of the present disclosure. Referring to FIG. 12, a summary image 2500 includes a map 2501, a point display 2503, a route display 2505, the time icon 2407, and a behavior icon 2509.

In the illustrated example, the point display 2503 is displayed on the map 2501 as a position of the user when commentary is generated, but other map elements, for example, a road or a railway is not displayed. The point display 2503 may not necessarily be arranged based on information of the latitude and the longitude of the user when commentary is generated. That is, when compared with the map 2401 shown in the example of FIG. 11, not only the actual moving route of the user, but also even elements such as the latitude and the longitude of the generation point of commentary are considered to be abstracted on the map 2501.

As an effect of abstracting the current position information as described above, for example, the route display 2505 can be represented in a length so that each moving route can sufficiently be recognized. Of the route displays 2505 in the illustrated example, a route display 2505a is a route display corresponding to walking and a route display 2505b is a route display corresponding to a ride on a train. If these route displays are made according to the actual position information, the route display 2501a becomes shorter than the route display 2505b and it may become difficult under certain circumstances to recognize the route display 2505a (this is because the moving speed by train is far greater than the moving speed on foot). Thus, if, like the example shown on the map 2501, the point display 2503 and the route display 2505 can be arranged freely from the actual position information to a certain extent, it becomes easier to recognize the route display 2505 corresponding to each of behaviors of the user.

Also on the map 2501, as shown by, for example, behavior icons 2509a. 2509b, not only behavior accompanied by two-dimensional movement (for example, walking indicated by the behavior icon 2509a), but also behavior accompanied by three-dimensional movement (for example, an elevator indicated by the behavior icon 2509b) can be represented on the two-dimensional map.

(Fourth Example of Image)

Figure 13:
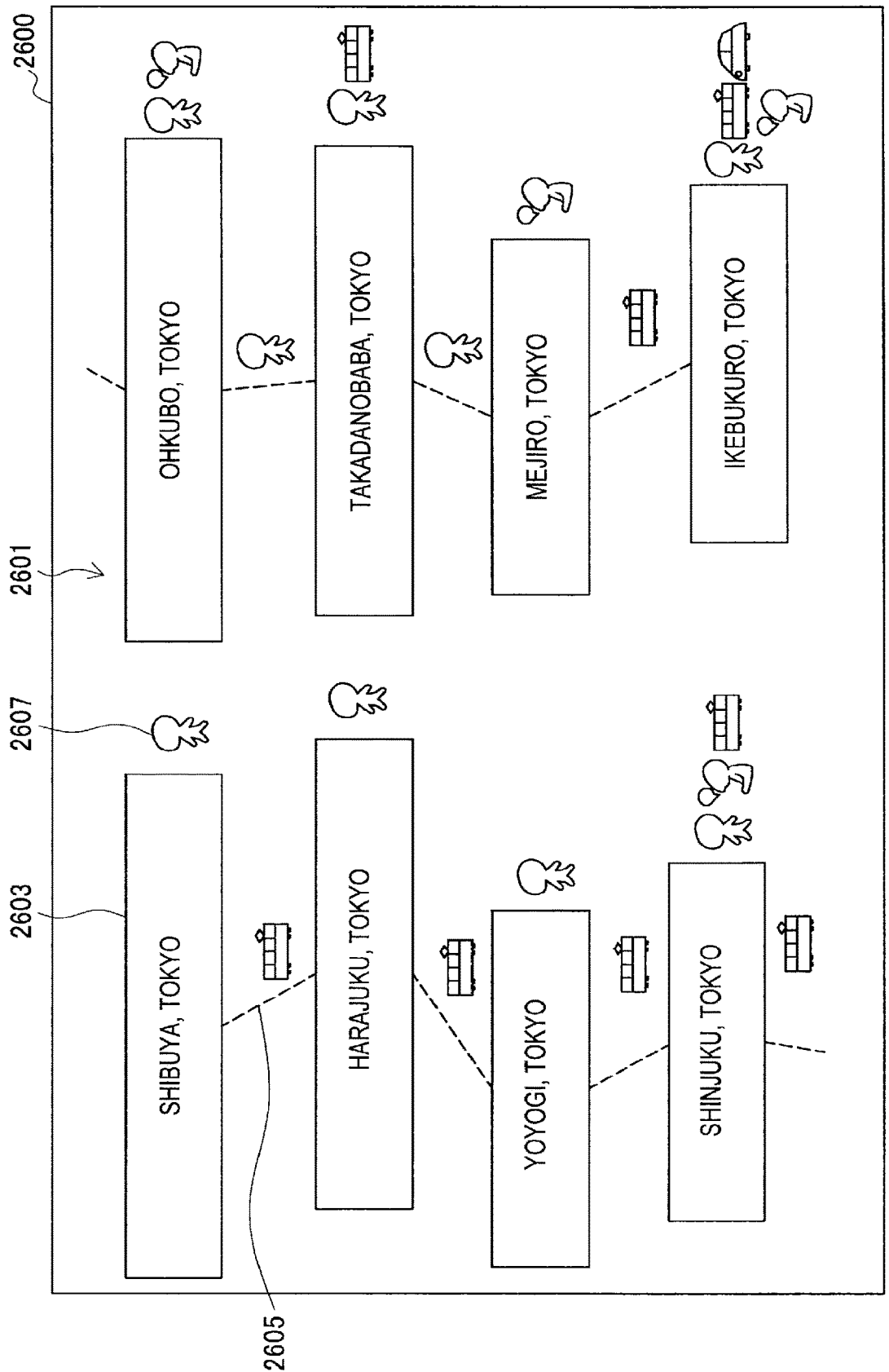
FIG. 13 is a diagram showing a fourth example of a commentary summary image displayed in an embodiment of the present disclosure.

FIG. 13 is a diagram showing a fourth example of the commentary summary image displayed in an embodiment of the present disclosure. Referring to FIG. 13, a summary map 2600 includes a map 2601, a place name display 2603, a moving route display 2605, and a behavior icon 2607.

In the illustrated example, the place name display 2603 indicating the user's position when commentary is generated is arranged on the map 2601 and the moving route display 2605 is displayed by connecting the place name displays 2603. The place name display 2603 does not correspond to the actual positional relationship represented by each place name. That is, actual position information is more abstracted on the map 2601 than on the map 2501 shown in the example of FIG. 12. By using such a display, for example, the user's position when commentary is generated can be presented in the form of the place name so that it is easy to understand. That is, the map 2601 is intended to convey position information of the user not as a figure on a map, but as mainly character information. The behavior icon 2607 is displayed next to the place name display 2603 to indicate user's behavior represented by commentary in each position.

(Fifth Example of Image)

Figure 14:
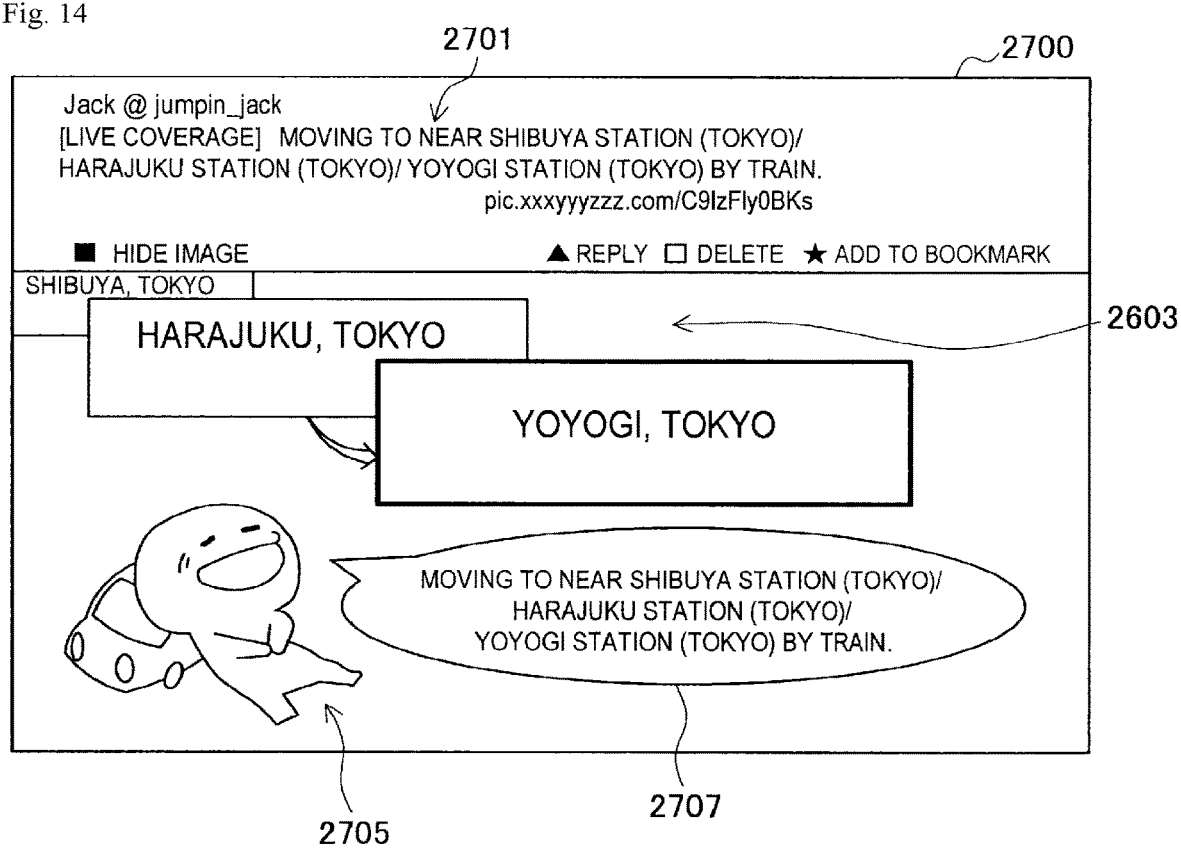
FIG. 14 is a diagram showing a fifth example of a commentary summary image displayed in an embodiment of the present disclosure.

FIG. 14 is a diagram showing a fifth example of the commentary summary image displayed in an embodiment of the present disclosure. Referring to FIG. 14, a summary map 2700 includes summary text 2701, the place name display 2603, a speaker image 2705, and a balloon 2707.

In the illustrated example, a summary of commentary generated in a predetermined time zone is represented by text as the summary text 2701 on the summary map 2700. The place name display 2603 is also displayed like the example shown in FIG. 13, but the place name display 2603 is not arranged two-dimensionally like the example in FIG. 13, but is arranged by adding depth so that a new one is placed forward. The speaker image 2705 is also displayed on the summary map 2700 and the same content as, for example, the summary text 2701 is displayed in the balloon 2707 as remarks of a character displayed by the speaker image 2705.

(Sixth Example of Image)

Figure 15:
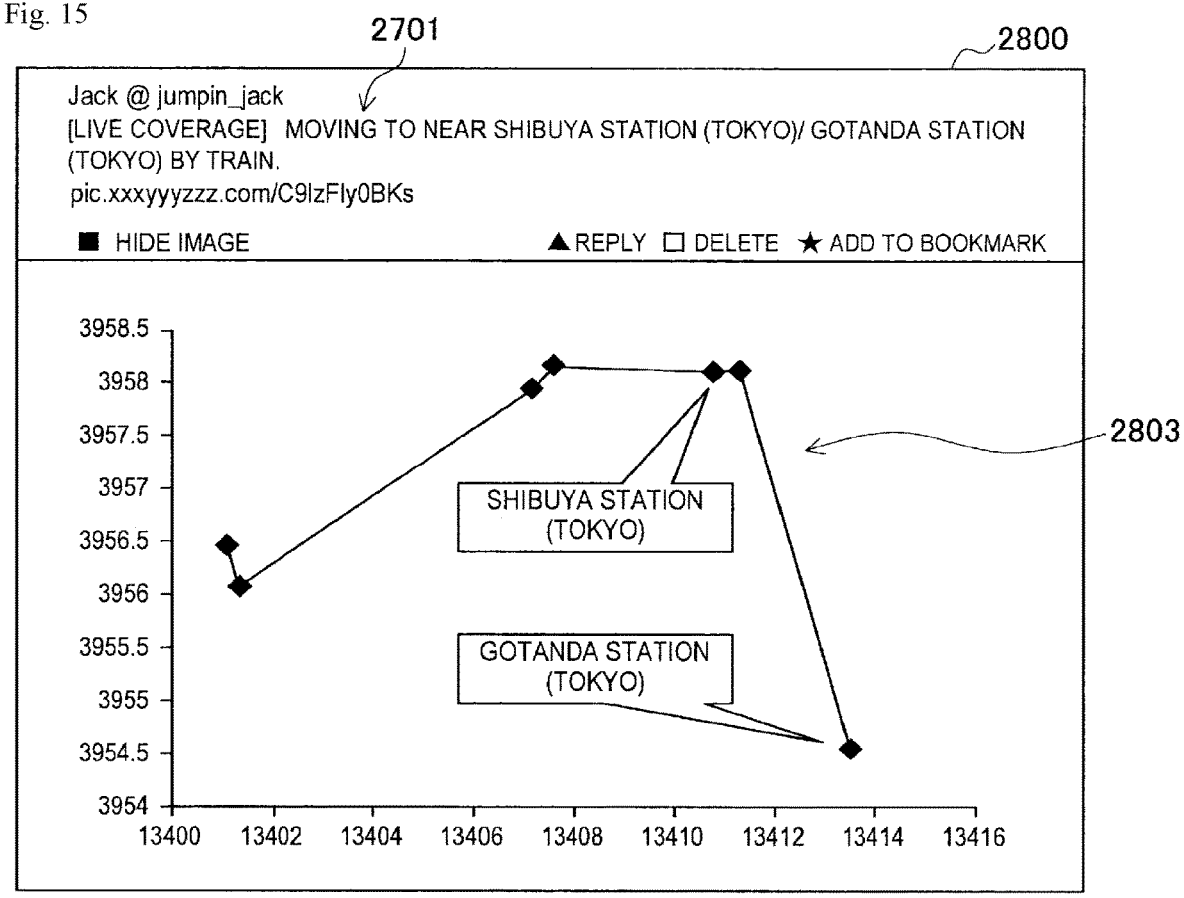
FIG. 15 is a diagram showing a sixth example of a commentary summary image displayed in an embodiment of the present disclosure.

FIG. 15 is a diagram showing a sixth example of the commentary summary image displayed in an embodiment of the present disclosure. Referring to FIG. 15, a summary map 2800 includes the summary text 2701, which is the same as that in the example of FIG. 14, and a map 2803.

In the illustrated example, a summary of commentary generated in a predetermined time zone is represented by text as the summary text 2701 on the summary map 2800. Further, a history of position information of the user when commentary is generated is shown on the map 2803. Like the map 2401 in the example of FIG. 11 described above, map elements other than the user's position, for example, a road or a railway is not displayed on the map 2803. On the map 2803, position information of the user is represented as a straight line connecting points on a two-axis graph based on information of the latitude and the longitude when commentary is generated.

In the present embodiment, as described above, various images can be generated as a summary image of commentary based on user's behavior. These images contain, for example, a map to represent changes of the user's position when commentary is generated. The map may be represented based on, for example, the actual position information or a portion of the actual position information, for example, a moving route of the user between positions where commentary is generated or information of the latitude and the longitude of a position where commentary is generated may be abstracted. By generating a map in this manner, for example, a plurality of behaviors of the user with a big difference in the moving distance can be represented in a way that it is easy to recognize each of behaviors or movement in the height direction, which is difficult to represent two-dimensionally, can be represented. In addition, by abstracting the actual position information on a map, user's privacy may be protected.

(7. Operation when Starting and Ending Commentary)

Figure 16:
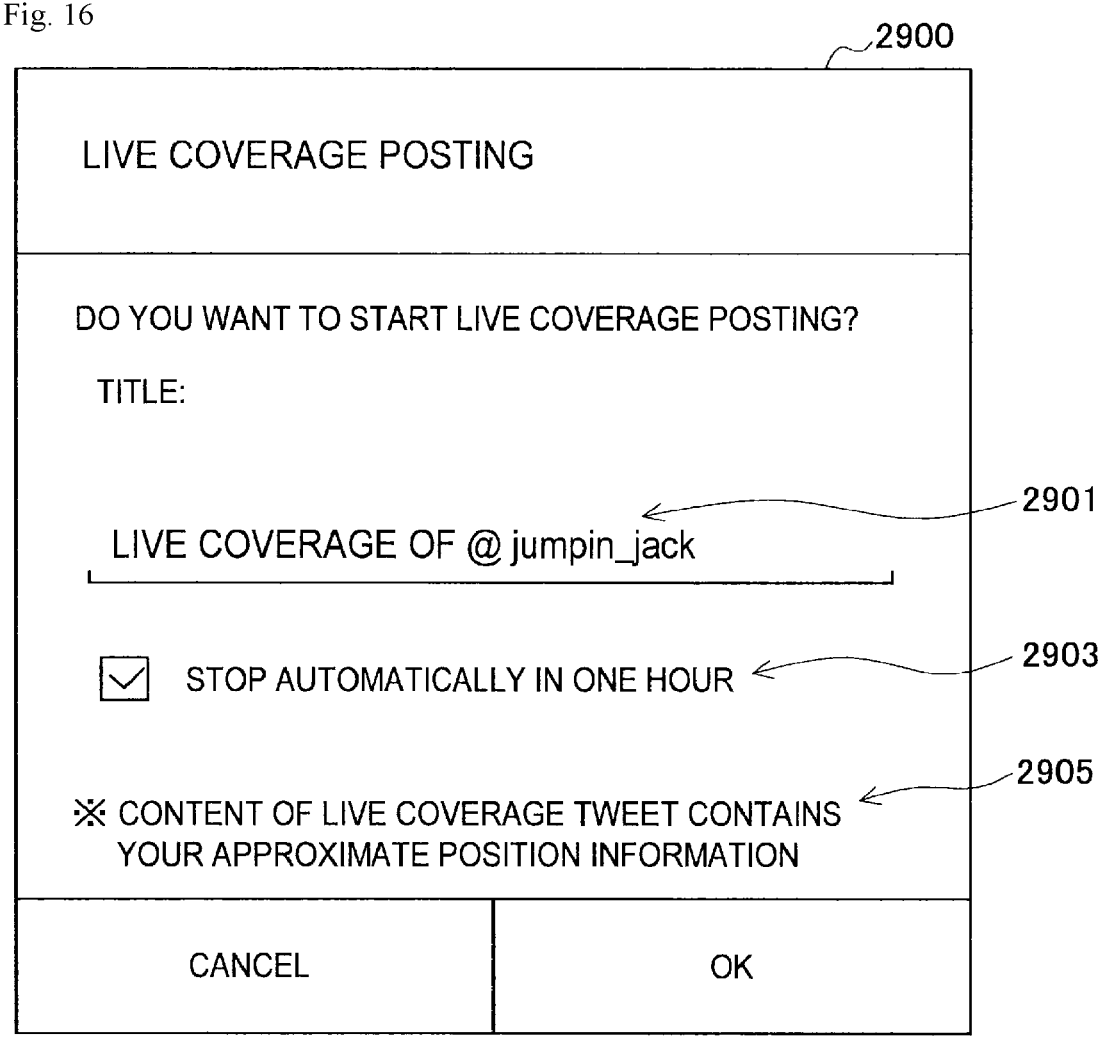
FIG. 16 is a diagram showing an example of a dialog display when commentary in an embodiment of the present disclosure is started.

FIG. 16 is a diagram showing an example of a dialog display when commentary in an embodiment of the present disclosure is started. Referring to FIG. 16, a dialog 2900 includes a title input field 2901, an auto stop switch 2903, and an annotation 2905.

In the present embodiment, as described above, generation of commentary based on user's behavior may be limited to a period of time specified by the user. In such a case, the user causes a menu invoked from the list display screen 1100, the virtual space display screen 1200, the posting history screen 1300, the behavior summary screen 1400 or the like to display the dialog 1900 as illustrated in FIG. 16. In each of the above screens, a screen element such as a button caused to display a menu is not necessarily illustrated.

In the title input field 2901, the user can freely set the title of commentary. As illustrated, a title like "live coverage of (user name)" may be initially set to the title input field 2901. The auto stop switch 2903 is a switch that enables the user to automatically stop the generation of commentary when a predetermined time passes after starting the generation. In the illustrated example, if the auto stop switch 2903 (check box) is set to ON, the generation of commentary is automatically stopped when a predetermined time (one hour) elapses after "OK" is selected in the dialog 2900. However, the predetermined time is not limited to one hour and may be any time such as two hours, three hours, or 30 minutes.

The annotation 2905 notifies the user that position information of the user is open by the generation of commentary. It is possible to abstract position information when position information is not included in text of commentary and a map as shown in FIG. 12 is displayed in the summary image, but otherwise, in contrast to applications (in which position information is not open) of behavior sharing as described with reference to FIGS. 3 to 7, it is desirable to obtain an approval from the user of the fact that position information of the user is open in the form of the annotation 2905. Commentary can be generated, as described above, without using position information of the user. Therefore, when, for example, commentary is generated without using position information, confirmation by the dialog 2900 may be omitted to start the generation of commentary. In addition, for example, the user may be allowed to select whether to use position information to generate commentary in the dialog 2900.

If, for example, the auto stop switch 2903 is not set to ON in the dialog 2900, the generation of commentary is finished by a user operation performed separately. In such a case, for example, the generation of commentary may be allowed to end by selecting an item meaning "finish commentary" from the menu invoked from each of the above screens. In addition, even if the auto stop switch 2903 is not set to ON in the dialog 2900, the generation of commentary may be automatically finished when a sufficiently long time (for example, 8 hours, 12 hours or the like) passes.

(8. Hardware Configuration)

Figure 17:
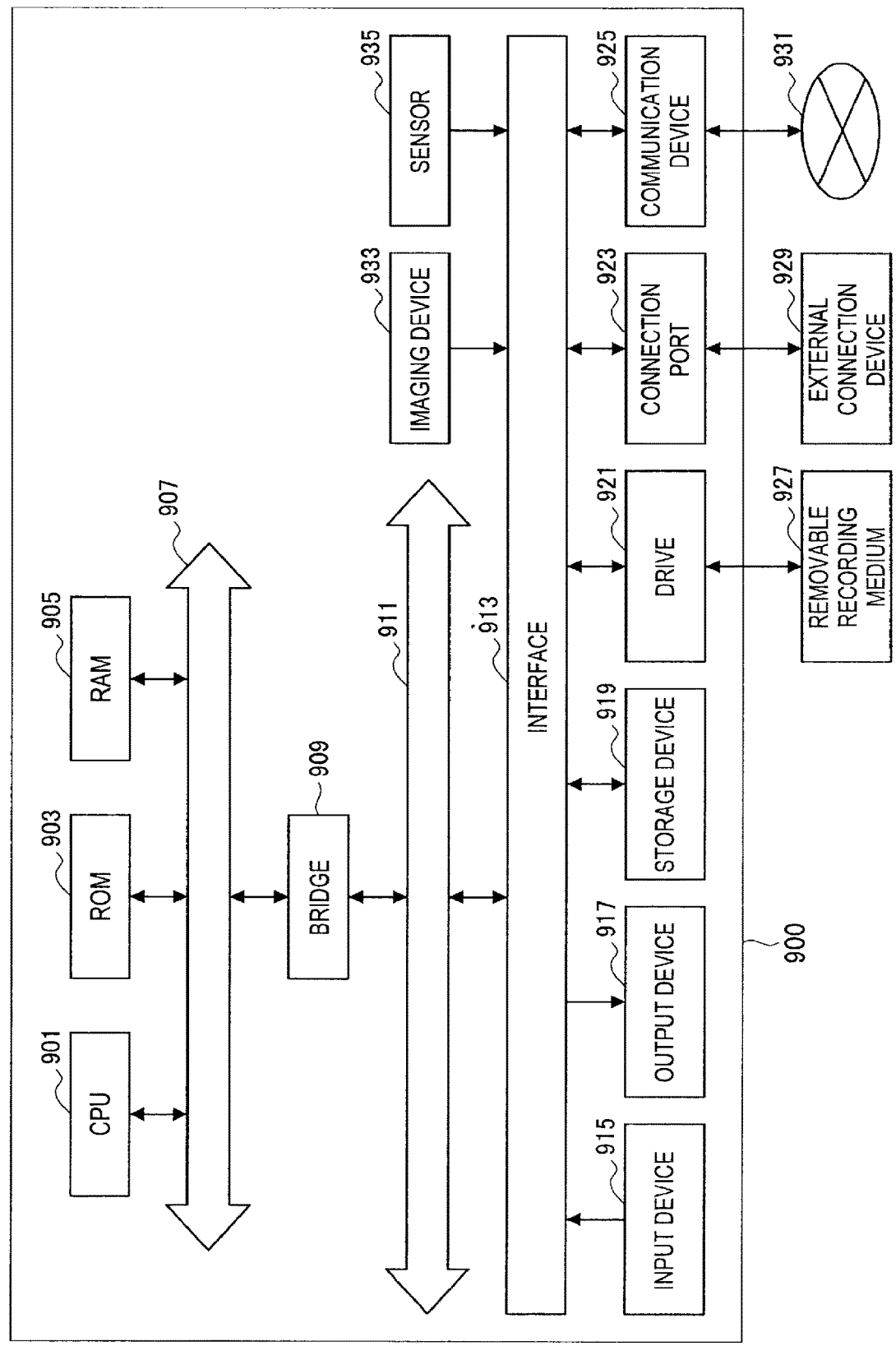
FIG. 17 is a block diagram illustrating a hardware configuration of an information processing apparatus.

Next, the hardware configuration of an information processing apparatus according to an embodiment of the present disclosure will be described with reference to FIG. 17. FIG. 17 is a block diagram illustrating the hardware configuration of an information processing apparatus. Information processing apparatus 900 illustrated in FIG. 17 can realize, for example, the client apparatus 100 or the server apparatus 200 in the above embodiment.

The information processing apparatus 900 includes a CPU (Central Processing Unit) 901, a ROM (Read Only Memory) 903, and a RAM (Random Access Memory) 905. In addition, the information processing apparatus 900 may include a host bus 907, a bridge 909, an external bus 911, an interface 913, an input device 915, an output device 917, a storage device 919, a drive 921, a connection port 923, and a communication device 925. Further, the information processing apparatus 900 may include an imaging device 933 and a sensor 935 as necessary. The information processing apparatus 900 may include a processing circuit such as a DSP (Digital Signal Processor), alternatively or in addition to the CPU 901.

The CPU 901 serves as an operation processor and a controller, and controls all or some operations in the information processing apparatus 900 in accordance with various programs recorded in the ROM 903, the RAM 905, the storage device 919 or a removable recording medium 927. The ROM 903 stores programs and operation parameters which are used by the CPU 901. The RAM 905 primarily stores program which are used in the execution of the CPU 901 and parameters which is appropriately modified in the execution. The CPU 901, ROM 903, and RAM 905 are connected to each other by the host bus 907 configured to include an internal bus such as a CPU bus. In addition, the host bus 907 is connected to the external bus 911 such as a PCI (Peripheral Component Interconnect/Interface) bus via the bridge 909.

The input device 915 may be a device which is operated by a user, such as a mouse, a keyboard, a touch panel, buttons, switches and a lever. The input device 915 may be, for example, a remote control unit using infrared light or other radio waves, or may be an external connection device 929 such as a portable phone operable in response to the operation of the information processing apparatus 900. Furthermore, the input device 915 includes an input control circuit which generates an input signal on the basis of the information which is input by a user and outputs the input signal to the CPU 901. By operating the input device 915, a user can input various types of data to the information processing apparatus 900 or issue instructions for causing the information processing apparatus 900 to perform a processing operation.

The output device 917 includes a device capable of visually or audibly notifying the user of acquired information. The output device 917 may include a display device such as LCD (Liquid Crystal Display), PDP (Plasma Display Panel), and organic EL (Electro-Luminescence) displays, an audio output device such as speaker and headphone, and a peripheral device such as printer. The output device 917 may output the results obtained from the process of the information processing apparatus 900 in a form of a video such as text or image, and an audio such as voice or sound.

The storage device 919 is a device for data storage which is configured as an example of a storage unit of the information processing apparatus 900. The storage device 919 includes, for example, a magnetic storage device such as HDD (Hard Disk Drive), a semiconductor storage device, an optical storage device, or a magneto-optical storage device. The storage device 919 stores programs to be executed by the CPU 901, various data, and data obtained from the outside.

The drive 921 is a reader/writer for the removable recording medium 927 such as a magnetic disk, an optical disk, a magneto-optical disk, or a semiconductor memory, and is embedded in the information processing apparatus 900 or attached externally thereto. The drive 921 reads information recorded in the removable recording medium 927 attached thereto, and outputs the read information to the RAM 905. Further, the drive 921 can write in the removable recording medium 927 attached thereto.

The connection port 923 is a port used to directly connect devices to the information processing apparatus 900. The connection port 923 may include a USB (Universal Serial Bus) port, an IEEE1394 port, and a SCSI (Small Computer System Interface) port. The connection port 923 may further include an RS-232C port, an optical audio terminal, an HDMI (High-Definition Multimedia Interface) port, and so on. The connection of the external connection device 929 to the connection port 923 makes it possible to exchange various data between the information processing apparatus 900 and the external connection device 929.

The communication device 925 is, for example, a communication interface including a communication device or the like for connection to a communication network 931. The communication device 925 may be, for example, a communication card for a wired or wireless LAN (Local Area Network), Bluetooth (registered trademark), WUSB (Wireless USB) or the like. In addition, the communication device 925 may be a router for optical communication, a router for ADSL (Asymmetric Digital Subscriber Line), a modem for various kinds of communications, or the like. The communication device 925 can transmit and receive signals to and from, for example, the Internet or other communication devices based on a predetermined protocol such as TCP/IP. In addition, the communication network 931 connected to the communication device 925 may be a network or the like connected in a wired or wireless manner, and may be, for example, the Internet, a home LAN, infrared communication, radio wave communication, satellite communication, or the like.

The imaging device 933 is a device that generates an image by imaging a real space using an image sensor such as a charge-coupled device (CCD) or complementary metal-oxide-semiconductor (CMOS) sensor, as well as various members such as one or more lenses for controlling the formation of a subject image on the image sensor, for example. The imaging device 933 may be a device that takes still images, and may also be a device that takes moving images.

The sensor 935 is any of various sensors such as an acceleration sensor, a gyro sensor, a geomagnetic sensor, an optical sensor, or a sound sensor, for example. The sensor 935 acquires information regarding the state of the information processing apparatus 900, such as the orientation of the case of the information processing apparatus 900, as well as information regarding the environment surrounding the information processing apparatus 900, such as the brightness or noise surrounding the information processing apparatus 900, for example. The sensor 935 may also include a Global Positioning System (GPS) sensor that receives GPS signals and measures the latitude, longitude, and altitude of the apparatus.

The foregoing thus illustrates an exemplary hardware configuration of the information processing apparatus 900. Each of the above components may be realized using general-purpose members, but may also be realized in hardware specialized in the function of each component. Such a configuration may also be modified as appropriate according to the technological level at the time of the implementation.

(9. Supplemental Remarks)

Embodiments of the present disclosure encompass an information processing apparatus (client apparatus or server apparatus) and system as described in the foregoing, an information processing method executed by an information processing apparatus or system, a program for causing an information processing apparatus to function, and a non-transitory computer readable medium storing such a program, for example.

It should be understood by those skilled in the art that various modifications, combinations, sub-combinations and alterations may occur depending on design requirements and other factors insofar as they are within the scope of the appended claims or the equivalents thereof.

(1) An information processing system including: circuitry configured to generate commentary, the commentary including first commentary generated based on behavior information corresponding to a behavior of a user and second commentary associated with the first commentary; and output the commentary to be available to other users.

(2) The information processing system of (1), wherein the behavior information is generated based on sensor information acquired from one or more sensors included in a device.

(3) The information processing system of any of (1) to (2), wherein the one or more sensors include at least one of an acceleration sensor, a gyro sensor, a geomagnetic sensor, an optical sensor, a sound sensor, an atmospheric pressure sensor, and a positioning sensor.

(4) The information processing system of any of (1) to (3), further including: a communication interface configured to receive the sensor information from the device via a network, wherein the circuitry is configured to generate the behavior information based on the sensor information received from the device.

(5) The information processing system of any of (1) to (4), wherein the first commentary corresponds to a description of the user's behavior.

(6) The information processing system of any of (1) to (5), wherein the circuitry is configured to: compare a pattern of the behavior of the user to stored pattern information; and generate the first commentary by acquiring commentary corresponding to a stored pattern when the pattern of the behavior of the user matches the stored pattern.

(7) The information processing system of any of (1) to (6), wherein the first commentary is at least one of text commentary, audio commentary and an image.

(8) The information processing system of any of (1) to (7), wherein the second commentary is generated based on a content of the first commentary.

(9) The information processing system of any of (1) to (8), wherein the second commentary includes user information corresponding to a user associated with the second commentary.

(10) The information processing system of (9), wherein the user information is at least one of a thumbnail image, a user name and a user ID corresponding to the user.

(11) The information processing system of any of (1) to (11), wherein the second commentary includes user information corresponding to a user associated with the second commentary.

(12) The information processing system of any of (1) to (11), wherein the second commentary includes descriptive commentary corresponding to the behavior of the user.

(13) The information processing system of any of (1) to (12), wherein the second commentary includes identification information corresponding to the user.

(14) The information processing system of any of (1) to (13), wherein the second commentary includes position information corresponding to the user.

(15) The information processing system of any of (1) to (14), wherein the second commentary includes information indicating a duration of the behavior of the user.

(16) The information processing system of any of (1) to (15), wherein the behavior of the user corresponds to at least one of walking and running and the second commentary includes descriptive commentary corresponding to a speed of the at least one of the walking and running.

(17) The information processing system of any of (1) to (16), wherein the second commentary includes information based on a history of a past behavior of the user.

(18) The information processing system of any of (1) to (17), wherein the circuitry is configured to generate the second commentary from a perspective of a disinterested observer.

(19) The information processing system of any of (1) to (18), wherein the second commentary is generated based on a change in the behavior of the user.

(20) The information processing system of any of (1) to (19), wherein the second commentary includes information corresponding to a time of day of the behavior of the user.

(21) The information processing system of any of (1) to (20), wherein the first commentary corresponds to an image, and the second commentary is generated based on a content of the image.

(22) The information processing system of any of (1) to (21), wherein the circuitry is configured to: compare a pattern of the behavior of the user to stored pattern information; and generate the second commentary by acquiring commentary corresponding to a stored pattern when the pattern of the behavior of the user matches the stored pattern.

(23) The information processing system of any of (1) to (22), wherein the second commentary is at least one of text commentary, audio commentary and an image.

(24) The information processing system of any of (1) to (23), wherein the circuitry is configured to output the commentary by posting the commentary to social media.

(25) The information processing system of any of (1) to (24), wherein the circuitry is configured to generate display data based on the commentary.

(26) The information processing system of (25), wherein the display data includes a list containing user information corresponding to a plurality of users and commentary corresponding to a behavior of each of the plurality of users in time-series.

(27) The information processing system of (26), wherein the display data includes identification information corresponding to each of the plurality of users.

(28) The information processing system of (26), wherein the display data includes image data corresponding to each of the plurality of users.

(29) The information processing system of (26), wherein the display data includes image data corresponding to the behavior of each of the plurality of users.

(30) The information processing system of (25), wherein the display data corresponds to a virtual space.

(31) The information processing system of (30), wherein the virtual space includes image data corresponding to each of the plurality of users disposed at positions in the virtual space corresponding to a behavior of each of the plurality of users.

(32) The information processing system of (31), wherein the image data corresponds to the behavior of each of the plurality of users.

(33) The information processing system of (25), wherein the display data indicates a history of the behavior of the user over a predetermined period of time displayed in time-series.

(34) The information processing system of (25), wherein the display data indicates, in graphical form, a percentage of time that a user performs each of a plurality of behaviors over a predetermined period of time.

(35) The information processing system of any of (1) to (34), wherein the circuitry is configured to: acquire a comment from one of the other users corresponding to the commentary; and output the acquired comment together with the commentary to be available to the other users.

(36) The information processing system of (25), wherein the display data includes a map having graphic indicia corresponding to the behavior of the user over a path traveled by the user.

(37) The information processing system of any of (1) to (36), wherein the information processing system is a server and the circuitry includes a processor configured to perform the generating and outputting.

(38) A method performed by an information processing system, the method including: generating commentary, the commentary including first commentary generated based on behavior information corresponding to a behavior of a user and second commentary associated with the first commentary; and outputting the commentary to be available to other users.

(39) A non-transitory computer-readable medium including computer-program instructions, which when executed by an information processing system, cause the information processing system to: generate commentary, the commentary including first commentary generated based on behavior information corresponding to a behavior of a user and second commentary associated with the first commentary; and output the commentary to be available to other users.

REFERENCE SIGNS LIST 10 system
20 server
100 client apparatus
200 server apparatus
300, 400, 500 function group
310 sensor
320 behavior recognition function
330 camera
340 posting function
410 activity acquisition function
430 commentary generation function
450 image generation function
470 output function
510 behavior sharing service
520 social media

The invention claimed is:

1. An information processing apparatus having installed thereon an activity social network application, the information processing apparatus comprising:
    circuitry configured to
        collect activity data of a user recognized from acceleration data;
        generate, by performing statistical processing on the activity data, commentary text data that indicates a result of the statistical processing, the commentary text data including a description or comment regarding a user status and including an identifier corresponding to a location in which the user is moving towards;
        create a commentary image that includes a virtual speaker and a text balloon, the text balloon including the commentary text data; and
        post the commentary image to social media.

2. The information processing apparatus of claim 1, wherein the circuitry is further configured to store the activity data, temporarily or continuously, in a memory.

3. The information processing apparatus of claim 1, wherein the circuitry is further configured to create, from user information of the user, a user information image.

4. The information processing apparatus of claim 3, wherein the user information image includes a user name of the user or a thumbnail image corresponding to the user.

5. The information processing apparatus of claim 1, wherein the circuitry is configured to generate the commentary text data in a case that the activity data changes.

6. The information processing apparatus of claim 1, wherein the user status indicates that the user is walking or running.

7. The information processing apparatus of claim 6, wherein the comment includes descriptive commentary corresponding to a speed of the walking or a speed of the running.

8. The information processing apparatus of claim 1, wherein the circuitry is configured to generate the commentary text data in a case that new activity data is collected.

9. The information processing apparatus of claim 1, wherein the activity data is generated based on sensor information acquired from the one or more sensors.

10. The information processing apparatus of claim 1, wherein to perform the statistical processing on the activity data, the circuitry is configured to
  compare a pattern of user activity indicated in the activity data to stored pattern information; and
  generate the commentary text data by acquiring a commentary corresponding to a stored pattern in a case that the pattern of the user activity matches the stored pattern.

11. The information processing apparatus of claim 1, wherein the description includes descriptive commentary corresponding to the user status and the activity data.

12. The information processing apparatus of claim 1, wherein the description includes information indicating a duration of a user activity indicated by the user status.

13. The information processing apparatus of claim 1, wherein the comment includes information based on a history of past user activity.

14. The information processing apparatus of claim 1, wherein the comment is generated based on a change in user activity.

15. The information processing apparatus of claim 1, wherein the circuitry is further configured to initiate display of a map having graphic indicia corresponding to user activity over a path progression.

16. The information processing apparatus of claim 1, wherein the circuitry is further configured to initiate display of a graph summarizing one day of the activity data of the user.

17. The information processing apparatus of claim 16, wherein the graph indicates a speed and distance traveled according to the activity data of the user.

18. The information processing apparatus of claim 1, wherein the circuitry is further configured to initiate display of an exercise graph showing an exercise state of at least one of walking or running at predetermined time intervals based on the activity data of the user.

19. The information processing apparatus of claim 1, wherein a name of the location is abstracted.

20. A method performed by an information processing apparatus, the method comprising:
  collecting activity data of a user recognized from acceleration data;
  generating, by processing circuitry of the information processing apparatus performing statistical processing on the activity data, commentary text data that indicates a result of the statistical processing, the commentary text data including a description or comment regarding a user status and including an identifier corresponding to a location in which the user is moving towards;
  creating a commentary image that includes a virtual speaker and a text balloon, the text balloon including the commentary text data; and
  posting the commentary image to social media.

21. A non-transitory computer-readable medium including computer-program instructions, which when executed by an information processing apparatus, cause the information processing apparatus to:
  collect activity data of a user recognized from acceleration data;
  generate, by performing statistical processing on the activity data, commentary text data that indicates a result of the statistical processing, the commentary text data including a description or comment regarding a user status and including an identifier corresponding to a location in which the user is moving towards;
  create a commentary image that includes a virtual speaker and a text balloon, the text balloon including the commentary text data; and
  post the commentary image to social media.

* * * * *